US010318865B2

(12) United States Patent
Glyman et al.

(10) Patent No.: US 10,318,865 B2
(45) Date of Patent: Jun. 11, 2019

(54) ANTI-FINGERPRINTING SYSTEMS AND METHODS FOR AUTOMATED TASK PERFORMANCE

(71) Applicant: Capital One Services, LLC, McLean, VA (US)

(72) Inventors: Eric Glyman, Brooklyn, NY (US); William James Russell Locke, Old Westbury, NY (US); Kathleen Zasada, Brooklyn, NY (US); Philippe Tyan, New York, NY (US); Jae In Lee, Brooklyn, NY (US); Karim Atiyeh, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/669,874

(22) Filed: Aug. 4, 2017

(65) Prior Publication Data

US 2019/0005388 A1 Jan. 3, 2019

Related U.S. Application Data

(60) Provisional application No. 62/528,030, filed on Jun. 30, 2017.

(51) Int. Cl.
*G06F 15/18* (2006.01)
*G06N 3/08* (2006.01)
(Continued)

(52) U.S. Cl.
CPC .......... *G06N 3/08* (2013.01); *G06F 9/45558* (2013.01); *G06Q 10/02* (2013.01); *G06F 2009/45562* (2013.01)

(58) Field of Classification Search
CPC .... G06Q 10/02; G06Q 10/025; G06Q 10/063; G06Q 10/107; G06Q 10/109; G06Q 30/04; G06Q 30/06; G06Q 50/14; G06Q 50/32
See application file for complete search history.

(56) References Cited

U.S. PATENT DOCUMENTS 5,727,950 A * 3/1998 Cook ..................... G09B 5/02 434/350
6,021,427 A * 2/2000 Spagna ................. H04L 51/14 709/206
(Continued)

*Primary Examiner* — Luis A Sitiriche
(74) *Attorney, Agent, or Firm* — Finnegan Henderson Farrabow, Garrett & Dunner LLP

(57) ABSTRACT

Computer-implemented methods and systems are provided for automatically performing a task on a remote computer. During a registration stage, the system receives personal information of a human user, obtains an IP address and a device configuration for a computing device, and stores the personal information, IP address, and the device configuration in record in a database. The system receives a request to interact with a remote website to perform a task, the request including the personal information of the human user. The system then retrieves the record from the database using the personal information. The system creates a virtual machine based on the device configuration for the computing device, selects one of a geographically distributed set of proxy servers having an IP geographically address resembling the IP address for the computing device, and executes instructions causing the virtual machine to interact with the remote website using the proxy server to perform the task.

20 Claims, 16 Drawing Sheets

(51) Int. Cl.
*G06Q 10/02* (2012.01)
*G06F 9/455* (2018.01)

(56) References Cited

U.S. PATENT DOCUMENTS

| | | | | | |
|---|---|---|---|---|---|
| 6,427,063 | B1 * | 7/2002 | Cook | G09B 7/00 | 434/118 |
| 7,636,792 | B1 * | 12/2009 | Ho | H04L 67/2823 | 709/200 |
| 7,769,611 | B1 * | 8/2010 | Rodriguez | G06Q 10/02 | 705/7.11 |
| 2002/0178226 | A1 * | 11/2002 | Anderson | H04W 4/12 | 709/206 |
| 2004/0098408 | A1 * | 5/2004 | Gensel | G06F 8/20 | 707/999.104 |
| 2004/0226009 | A1 * | 11/2004 | Mese | G06F 8/60 | 717/174 |
| 2006/0070075 | A1 * | 3/2006 | Rodionov | H04L 67/125 | 718/102 |
| 2008/0062969 | A1 * | 3/2008 | Picard | H04L 51/18 | 370/352 |
| 2011/0185016 | A1 * | 7/2011 | Kandasamy | G06Q 10/06 | 709/203 |
| 2011/0202529 | A1 * | 8/2011 | Waschke | G06F 8/71 | 707/737 |
| 2011/0208855 | A1 * | 8/2011 | Robertson | H04L 41/0853 | 709/224 |
| 2011/0314382 | A1 * | 12/2011 | Sweeney | G06F 17/30731 | 715/738 |
| 2013/0212648 | A1 * | 8/2013 | Tietjen | H04L 63/10 | 726/4 |
| 2013/0254139 | A1 * | 9/2013 | Lei | G06N 99/005 | 706/11 |
| 2015/0026033 | A1 * | 1/2015 | Curran | G06Q 40/04 | 705/37 |
| 2016/0105317 | A1 * | 4/2016 | Zimmermann | G06F 9/4445 | 709/221 |

* cited by examiner

Reservation Confirmation #99645219 for Fancy Hotel

Fancy Hotel
◉ 123 Main Street, Any City, Any State 09876 USA
☎ 1-234-567-8901   Hotel Website   Map & Directions   Plan Your Stay

Reservation Confirmation: 99645219
For Person 1

| CHECK-IN DATE: Date 1 | CHECK-OUT DATE: Date 2 |
| CHECK-IN TIME: Time 1 | CHECK-OUT TIME: Time 2 |

[ Modify your reservation ]   [ Cancel your reservation ]

Dear Person 1,

While we're preparing for your upcoming stay with Fancy Hotel, here's everything necessary to make your trip a success.

Sincerely,
Fancy Hotel

Fig. 4A

```
<!DOCTYPE html>
<!--[if lt IE 7 ]> <html class="no-js ie6"> <![endif]-->
<!--[if IE 7 ]> <html class="no-js ie7"> <![endif]-->
<!--[if IE 8 ]> <html class="no-js ie8"> <![endif]-->
<!--[if (gte IE 9)|!(IE)]><!--> <html class="no-js"> <!--<![endif]-->
<html lang="en">

<img style="display:none;" arc="/ada/booklogic?tripid-d54e757a-d00e-4424-97ee-bcd1e0501e16" width="0" height="0" alt=""/>
<img id="bookLogicPageViewPixel" style="display:none;" arc="//beam.hlserve.com/travel?domain=www.expedia.com&culture=en-US&publisher=expedia&pageName=Confirmation&rooms=1&publisherUserGuid=6efa171f8e2a4908b241e0545ef84d1d&adults=1&children=0&deviceType=Desktop&expediaPageName=page.Itin.Detail"/>
<head>
<meta name="rating" content="GENERAL"/>
<meta name="robots" content="INDEX"/>
<link rel="canonical" href="https://www.expedia.com/trips/11670447534 88"/>
<meta http-equiv="X-UA-Compatible" content="IE=edge,chrome=1"/><script type="text/javascript">
...
```

Fig. 4B

| | |
|---|---|
| Total price | $209.76 |
| Reservation number | 99645219 |
| Check-in date | November 1, 2017 |
| Check-out date | November 2, 2017 |
| Hotel name | Delta Hotels Baltimore Hunt Valley |
| Hotel address | 245 Shawan Road, Hunt Valley, Maryland 21031 USA |

Fig. 4C

```
    - is_length_between_6_and_15: True
      is_common_phone_format: False
      distance_to_keywords: 1
      correct_value: True
```

```
email1:
  - confirmation number:
    - is_length_between_6_and_15: True
      is_common_phone_format: False
      distance_to_keywords: 1
      correct_value: True
    - is_length_between_6_and_15: False
      is_common_phone_format: True
      distance_to_keywords: 30
      correct_value: False
      ...
  - check_in_date:
    - is_second_greatest_in_cluster: True
      is_least_in_cluster: False
      distance_to_keywords: 1
      correct_value: True
  ...
email2:
...
```

Fig. 6B

| PARSED FIELDS | | | |
|---|---|---|---|
| FIELD | VALUE | ADMIN VERIFIED | DELETE? |
| ParsedField object num_adults | 2 adults | Yes ◆ | ☐ |
| ParsedField object hotel_address | 85-4577 Mamalahoa Hwy, Captain Cook HI 9 | Yes ◆ | ☐ |
| ParsedField object total_price | 275.04 | Yes ◆ | ☐ |
| ParsedField object confirmation_number | 15621112 | Yes ◆ | ☐ |
| ParsedField object is_non_smoking | True | Yes ◆ | ☐ |
| ParsedField object check_in_date | 2017-01-01 00:00:00 | Yes ◆ | ☐ |
| ParsedField object itinerary_number | 7227558409904 | Yes ◆ | ☐ |
| ParsedField object num_nights | 2 nights | Yes ◆ | ☐ |
| ParsedField object check_out_date | Jan 3, 2017 | Yes ◆ | ☐ |

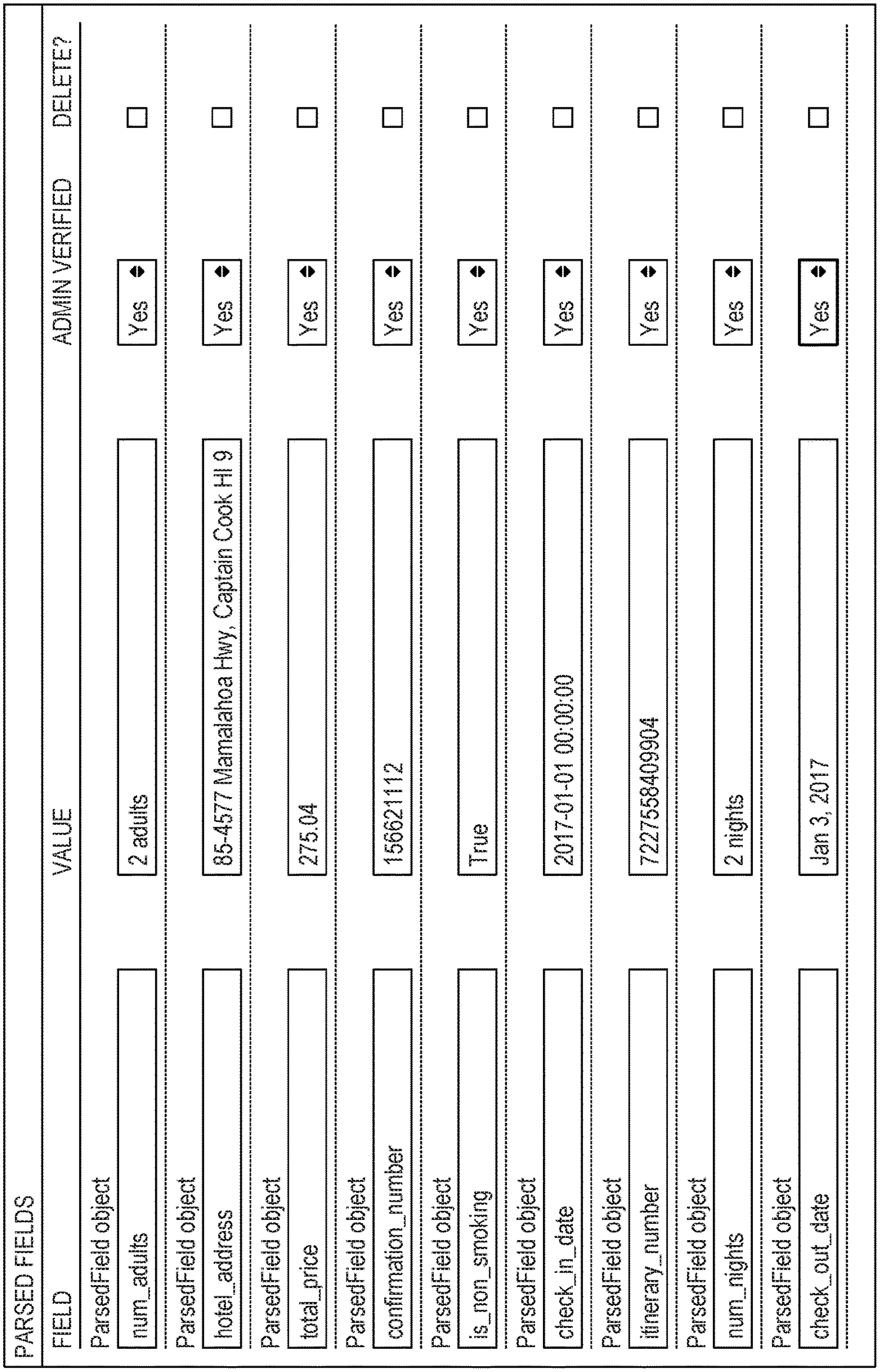

Fig. 8

ANTI-FINGERPRINTING SYSTEMS AND METHODS FOR AUTOMATED TASK PERFORMANCE

RELATED APPLICATIONS

This application claims the benefit of priority under 35 U.S.C. § 119(e) to U.S. Provisional Application No. 62/528,030, filed Jun. 30, 2017, and entitled "Neural Network Systems and Methods for Reservation Rebooking," which is hereby incorporated by reference in its entirety.

TECHNICAL FIELD

The disclosed embodiments concern the use of anti-fingerprinting technologies to defeat bot identification and blocking software. More specifically, the disclosed embodiments concern the application of neural networks and anti-fingerprinting technologies to automated performance of tasks on remote websites. The disclosed embodiments also concern the use of neural networks to parse emails and compare descriptions of items.

BACKGROUND

Accommodation, travel, and entertainment services are often reserved in advance of consumption of these services. However, providers of these services often lower prices to move unsold inventory prior to the reservation date. Sometimes, these providers allow customers to cancel their reservations without paying a fee or penalty. Customers would benefit from an automated rebooking service that monitored reservations, determined whether equivalent inventory was available for rebooking at a lower price, and offer customers the opportunity to cancel their existing reservations and rebook at this lower price.

However, technical problems have inhibited the development of such services. First, an automated rebooking service must know each user's current reservations. The service should be aware of these current reservations without the user having to describe them to the service (e.g., by filling out a form listing parameters describing the service). Second, an automated rebooking service must be able to compare each user's current reservations to available inventory items. These available inventory items may be obtained from different sources than the source of the original information. Therefore, even though the underlying inventory may be the same, it may be described differently. Thus automated rebooking service must be able to accommodate varying and inconsistent description of inventory across different sources of information. Additionally, websites of online booking agencies and service providers may be configured to identify and block requests from automated programs that run over the internet. Such blocking may limit the usefulness of an automated rebooking service.

Accordingly, a need exists for an automated rebooking service that can offer customers the opportunity to automatically rebook reservations while overcoming the technical problems that limit existing approaches.

SUMMARY

The disclosed embodiments can use neural networks to identify reservation emails, parse reservation emails for reservation parameters that describe reserved inventory, identify inventory parameters that describe available inventory items, and determine available inventory items equivalent to the reserved inventory item based on the extracted reservation parameters and inventory parameters. Furthermore, the disclosed embodiments can store user identities associating users with device configurations and IP addresses of users. The disclosed embodiments can use these stored user identities to imitate human users when automatically cancelling reservations, preventing identification and blocking of automatic cancellation requests using bot-detection software.

The disclosed embodiments include a system for automatically performing tasks on a remote website. This system can include at least one processor and at least one memory containing instructions. When executed by the at least one processor, the instructions can cause the system to perform operations. These operations can include obtaining an IP address and a device configuration of a first computing device of a human user. These operations can further include selecting a second computing device for imitating the human user based on the device configuration of the first computing device. The operations can additionally include selecting a proxy server based on the IP address for the first computing device. And the operations can also include causing the second computing device to interact with a remote website using the proxy server to perform a task.

The operations can further include, in some aspects, receiving a request to interact with the remote website to perform the task. The request can indicate the IP address and the device configuration of the first computing device.

The operations can also include, in various aspects, receiving personal information of the human user and storing a record in a database including the personal information, the IP address information of the first computing device, and the device configuration information of the first computing device. Additionally, these operations can include determining the personal information from the request and retrieving the record from the database using the personal information in response to the request.

The request can include an email from the human user and the personal information can include an email address of the human user, in some aspects. The request can include a text message from the human user and the personal information can include a phone number of the human user, in various aspects. The request can include, in some aspects, second computing device instructions for executing the task. The operations can further include, in various embodiments, determining second computing device instructions for executing the task based on the request.

The device configuration for first the computing device can be obtained from a user-agent header field of the first computing device, in some aspects. The device configuration for the first computing device can include, in various aspects, operating system information and browser information for the first computing device.

The second computing device can include, in some aspects, a virtual machine having the device configuration the first computing device. In various aspects, selecting the second computing device can include creating the virtual machine. The second computing device can have the same make and model as the first computing device, in some aspects. Causing the second computing device to interact with the remote website using the proxy server to perform the task can include remotely connecting to the second computing device, in various aspects.

The operations can further include, in various aspects, determining the geographic location of the first computing device of the human user based on the IP address for the first computing device. The proxy server can be selected, in some aspects, based on geographic proximity to first the computing device. In various aspects, an IP address of the proxy server can be in the same subnet range as the IP address of the first computing device.

The disclosed embodiments include a method for interacting with a remote website to perform an automatic task. This method can include, during a registration stage, receiving personal information of a human user, obtaining an IP address and a device configuration for a computing device, and storing a record in a database, the record including the personal information, the IP address, and the device configuration. The method can further include receiving a request to interact with a remote website to perform a task, the request including the personal information. The method can also include retrieving the record from the database using the personal information and creating a virtual machine based on the device configuration. The method can further include selecting a proxy server from a geographically distributed set of proxy servers based on the IP address for the computing device and the IP addresses for the set of proxy servers. The selected proxy server can be the proxy server of the set that is closest to the computing device. And the method can include executing instructions causing the virtual machine to interact with the remote website through the selected proxy server to perform the task.

As discussed above with regard to other embodiments, in some aspects the request can include an email from the human user and the personal information can include an email address of the human user. In various aspects the request can include a text message from the human user and the personal information can include a phone number of the human user. In some aspects, the request can include the instructions, and the set of proxy servers can be geographically distributed among multiple cities.

The disclosed embodiments include a system including at least one processor and at least one non-transitory memory containing instructions. When executed by the at least one processor, the instructions cause the system to perform operations. The operations include generating reservation parameters from a reservation email concerning a reserved inventory item using first neural networks. The operations further include generating sets of inventory parameters for available inventory items using the first neural networks. The operations also include determining a first available inventory item using a second neural network, the sets of inventory parameters, and the reservation parameters. The operations further include requesting a first booking system reserve the first available inventory item. And the operations also include requesting a second booking system cancel a reservation of the reserved inventory item.

Determining a first available inventory item using a second neural network, the sets of the inventory parameters, and the reservation parameters can include, in some aspects, generating comparison features in part using the reservation parameters and a first set of the inventory parameters for the first available inventory item. This determination can also include generating a first similarity value for the first available inventory item using the second neural network and the comparison features, and determining the first similarity value exceeds a predetermined similarity threshold. The comparison features can be generated, in some aspects, in part based on comparisons of the reservation email and the converted available inventory items.

Determining the first available inventory item using the second neural network, the sets of the inventory parameters, and the reservation parameters can further include generating a second similarity value exceeding the predetermined similarity threshold for a second inventory item, and determining the first similarity value exceeds the second similarity value.

The operations can include, in some aspects, determining additional available inventory items using the second neural network. The operations can also include determining price decreases and/or reputation increases as compared to the reserved inventory item for the first available inventory item and the additional available inventory items. And the operations can further include determining a price decrease and/or reputation increase for the first available inventory item exceeds price decreases and/or reputation increases for the additional available inventory items.

Generating the sets of the inventory parameters for the available inventory items using the first neural networks can include, in some aspects, receiving the available inventory items in a first format and converting the available inventory items to a second format of the reservation email. This generation can also include extracting potential inventory parameters corresponding to inventory parameters from the converted available inventory items. And this generation can further include selecting as the inventory parameters ones of the potential inventory parameters based on assessment values for the potential inventory parameters generated using the first neural networks. Generating the assessment values using the first neural networks can also include, in various aspects, generating feature vectors from the potential inventory parameters and inputting the feature vectors to the first neural networks to generate the assessment values. In some aspects, the first format can be JavaScript Object Notation (JSON) and the second format can be a markup language.

Generating the reservation parameters from the reservation email concerning the reserved inventory item using the first neural networks can include, in some aspects, extracting potential reservation parameters corresponding to a first reservation parameter from the reservation email. This generation can also include generating assessment values for the potential reservation parameters using the potential reservation parameters and a one of the first neural networks corresponding to the first reservation parameter. This generation can also include determining a greatest assessment value of the assessment values, the greatest assessment value exceeding a predetermined assessment threshold and corresponding to a first one of the potential reservation parameters. And this generation can further include selecting the first one of the potential reservation parameters as the first reservation parameter. The potential reservation parameters can be extracted from the reservation email using one or more rules corresponding to the first reservation parameter, in various aspects. Generating the assessment values for the potential reservation parameters using the potential reservation parameters and the one of the first neural networks corresponding to the first reservation parameter can include, in some aspects, generating feature vectors from the potential reservation parameters and inputting the feature vectors to the one of the first neural networks.

Generating the reservation parameters from the reservation email using the first neural networks can further include, in some aspects, generating a feature vector from the reservation email, and determining a cancellation policy using a third neural network and the feature vector.

The operations of the system can further include, in some aspects, retrieving the reservation email from an email system of the user. Retrieving the reservation email from the email system of the user can include, in various aspects, querying the email system of the user according to reservation email rules. Retrieving the reservation email from the email system of the user can include, in some aspects, retrieving emails from the email system of the user, generating feature vectors from the retrieved emails, and generating selection values for the emails using a third neural network and the feature vectors. And this retrieval can also include selecting one of the retrieved emails having a selection value exceeding a predetermined threshold as the reservation email.

The operations of the system can further include, in some aspects, notifying the user of the similar one of the available inventory items. The notification can display select reservation parameters, select inventory parameters, and a rebooking control in various aspects.

The reserved inventory item can be provided, in some aspects, by a first service provider and the first available inventory items can be provided by a second service provider. A single booking system can include the first booking system and the second booking system, in various aspects. In some aspects, the reserved inventory item can be an accommodation service, a travel service, or an entertainment service.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIG. 4A depicts an exemplary reservation confirmation email.

FIG. 4B depicts exemplary computer code for generating the reservation confirmation email of FIG. 4A.

FIG. 4C depicts exemplary reservation parameters extracted from the reservation confirmation email of FIG. 4A.

FIGS. 6A and 6B depict exemplary data structures and pseudocode for use in reservation parsing.

FIG. 8 depicts an exemplary graphical user interface for training a neural network used for reservation parsing.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the materials, methods, and examples are illustrative only and are not intended to be necessarily limiting.

Rebooking System

The disclosed systems and methods enable automatic monitoring and identification of rebooking opportunities. The user enables the service, providing access to an email address. The system then monitors the email address, identifying reservation confirmation emails. Using machine learning, the emails are parsed to extract reservation parameters. The system monitors the price of equivalent inventory, and alerts the user when equivalent inventory at lower prices become available. Should the user choose to rebook the reservation, the system automatically books the new inventory and cancels the prior reservation. In some embodiments, the system can automatically rebook the reservation without input from the user.

This system improves upon existing systems and methods because the user does not have to forward confirmation emails or specify reservation parameters. Consistent with disclosed embodiments, these improvements can be implemented using specific technological solutions to problems of parsing reservations, identifying equivalent inventory, and masking the automated nature of cancellation requests. Furthermore, the envisioned systems can submit cancellation requests using virtual machines configured to mimic the configuration of the user's system. This mimicry can prevent websites running bot-detection software from blocking the cancellation requests, providing a technical solution necessarily rooted in computer technology to overcome a specific internet-centric problem.

Though discussed herein with respect to a system for rebooking accommodation reservations, the disclosed systems and methods may also be used for reservations concerning other inventory, such as travel reservations (e.g., airplane, train, cruise ship, bus, or rental car reservations, etc.), entertainment reservations (e.g., tickets to concerts, sporting events, amusement parks, meal vouchers, drink vouchers, etc.), or any other refundable reservation for a good or service purchased, selected, chosen, and/or reserved (herein referred to as a "reserved inventory item") in advance of consumption of the good or service.

Figure 1:
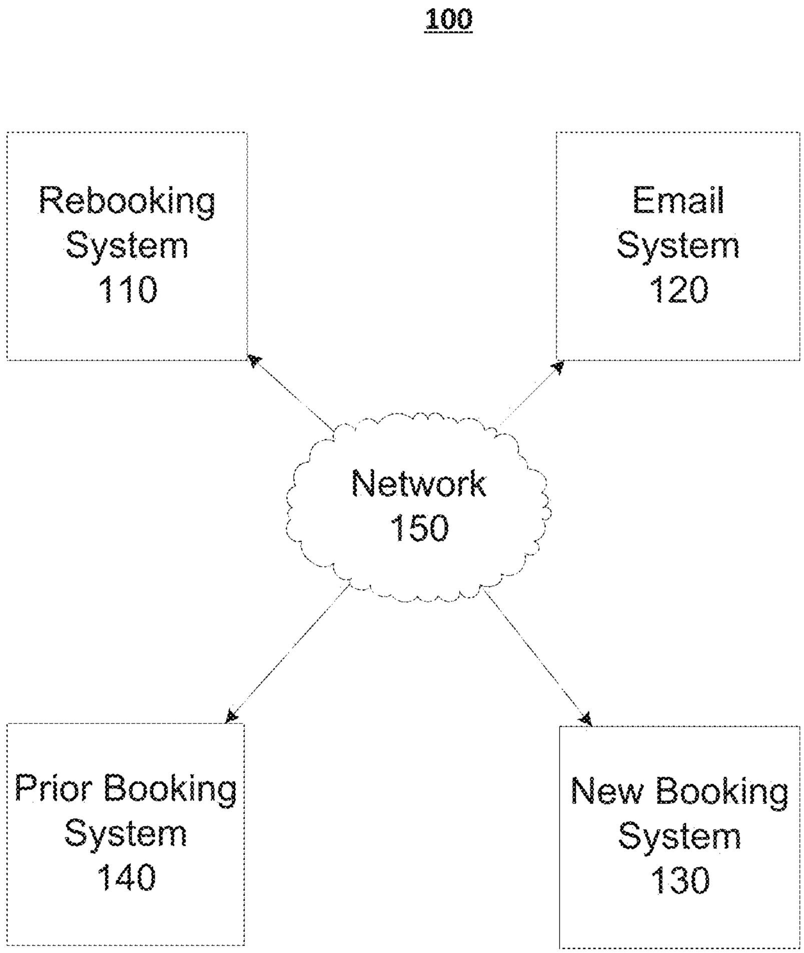
FIG. 1 is a schematic diagram of an exemplary system for reservation rebooking.

FIG. 1 is a schematic of an exemplary system for reservation rebooking (system 100), consistent with disclosed embodiments. In some embodiments, system 100 can comprise a rebooking system 110, an email system 120, a new booking system 130, and a prior booking system 140. These components may communicate with each other, or with other systems, using a network 150. Rebooking system 110 can be configured to retrieve reservation, receipt, confirmation, or similar emails concerning inventory items (herein referred to as "reservation emails") from email system 120 concerning a reserved inventory item, query new booking system 130 for available inventory items similar to the reserved inventory item (referred to herein as "similar inventory items"), and automatically communicate (i) directly with new booking system 130 to reserve the similar inventory items and (ii) indirectly with prior booking system 140 to cancel the reservation for the reserved inventory item. In some embodiments, rebooking system 110 can notify the user of one or more similar inventory items before performing the rebooking. Rebooking system 110 can perform the rebooking upon receiving permission from the user. In various embodiments, rebooking system 110 may be configured to perform the rebooking without notifying or receiving permission from the user.

Rebooking system 110 may include one or more computing devices, such as servers, workstations, desktop computers, or special-purpose computing devices. Rebooking system 110 may be a standalone system, or it may be part of a subsystem, which may be part of a larger system. Rebooking system 110 may comprise one or more applications and/or services. The computing devices can be configured to execute these applications and/or services to perform the functions described herein. For example, rebooking system 110 can be hosted on a cloud computing platform, such as AMAZON WEB SERVICES, SOFTLAYER, and MICROSOFT CLOUD. As an additional example, rebooking system 110 can be hosted on a workstation to perform the functions described herein.

Email system 120 may include one or more computing devices, such as servers, workstations, desktop computers, or special-purpose computing devices. Email system 120 may be a standalone system, or it may be part of a subsystem, which may be part of a larger system. Email system 120 can be configured to host one or more email accounts, such as an email account of a user. For example, email system 120 may comprise an email system such as OUTLOOK.COM, MICROSOFT EXCHANGE, GMAIL, YAHOO! MAIL, ICLOUD, or similar email system.

New booking system 130 may include one or more computing devices, such as servers, workstations, desktop computers, or special-purpose computing devices. New booking system 130 may be a standalone system, or it may be part of a subsystem, which may be part of a larger system. New booking system 130 may be configured to provide reservation booking capabilities. For example, new booking system 130 can be operated by, associated with, and/or controlled by an online booking agency (e.g., PRICELINE.COM, BOOKING.COM, AGODA.COM, KAYAK.COM, OPENTABLE, EXPEDIA.COM, HOTELS.COM, HOTWIRE.COM, TRAVELOCITY, ORBITZ, CHEAPTICKETS, EBOOKERS, SABRE, TICKETMASTER, or similar online system).

Prior booking system 140 may include one or more computing devices, such as servers, workstations, desktop computers, or special-purpose computing devices. Prior booking system 140 may be a standalone system, or it may be part of a subsystem, which may be part of a larger system. Prior booking system 140 may be configured to provide reservation booking capabilities. For example, prior booking system 140 can be operated by, associated with, and/or controlled by an online booking agency. As an additional example, prior booking system 140 can be operated by, associated with, and/or controlled by a service provider, such as a hotel or hotel chain, music venue, restaurant, resort, airline, train company (e.g., AMTRAK), or similar service provider.

Network 150 may be configured to provide communications between components of FIG. 1. For example, network 150 may be any type of network (including infrastructure) that provides communications, exchanges information, and/or facilitates the exchange of information, such as the Internet, a Local Area Network, or other suitable connection(s) that enables system 100 to send and receive information between the components of system 100.

As would be appreciated by one of ordinary skill in the art, the particular division of functionality depicted in FIG. 1 is not intended to be limiting. In some embodiments, one system can be configured to perform the functions of more than one component of system 100. For example, one system can perform the functionality of one or more of email system 110, rebooking system 120, or new booking system 130. As an additional example, one system can perform the functionality of both new booking system 130 and prior booking system 140. In some embodiments, multiple systems can be configured to perform the functions of a component of system 100. For example, multiple systems can perform the functions of rebooking system 110. In this example, a first system can retrieve emails from email system 120, while a second system parses the emails, and a third system queries new booking system 130 and determines similar inventory items. Additional rearrangements and distributions of functionality would be apparent to one of skill in the art.

Figure 2:
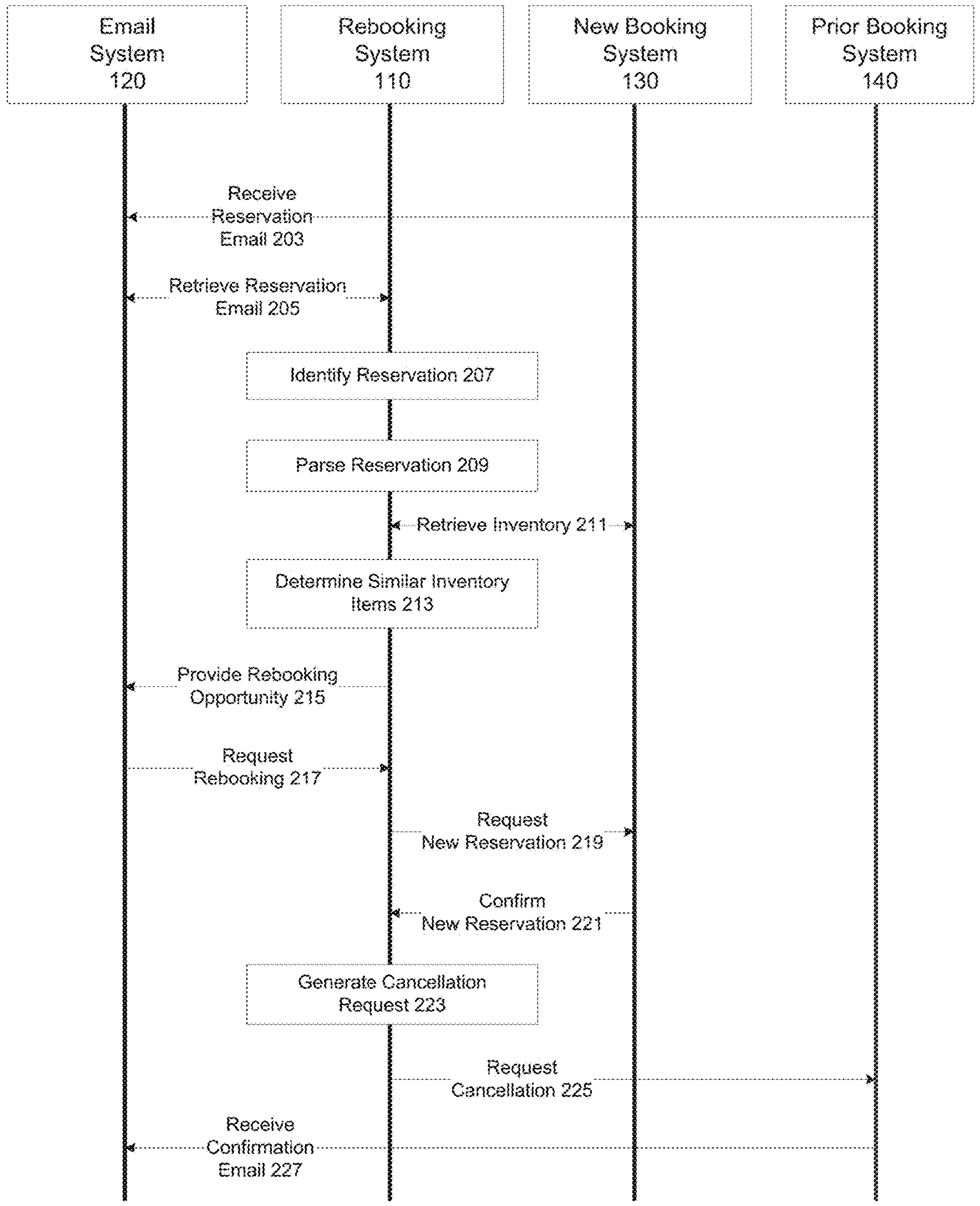
FIG. 2 is a flowchart of an exemplary method for reservation rebooking.

FIG. 2 is a flowchart of an exemplary method for reservation rebooking, consistent with disclosed embodiments. In step 203, prior booking system 140 can provide a reservation email to the account of a user on email system 120. This reservation email can be provided in response to the user reserving inventory using the prior booking system.

In steps 205 and 207, as described in greater detail below with regard to FIGS. 3A and 3B, rebooking system 110 can retrieve the reservation email from email system 120. Rebooking system 110 can be configured to access the account of the user hosted on email system 120. In some aspects, the user (not shown) can provided username and password information for this account. The user can provide this information, for example, while registering for the rebooking service provided by rebooking system 110. In some embodiments, rebooking system 110 can be configured to use an application programming interface (API) exposed by email system 120 to retrieve the emails (e.g., GMAIL API, YAHOO MAIL API, etc.). In various embodiments, rebooking system 110 can be configured to work with a third party service to retrieve emails from the account of the user.

As would be appreciated by one of skill in the art, retrieving the reservation email from email system 120 involves identifying reservation emails. This identification can be performed entirely by rebooking system 110, entirely by email system 120, or partially by rebooking system 110 and email system 120. For example, rebooking system 110 can retrieve new emails from email system 120 and then determine whether any of the retrieved emails are reservation emails. As an additional example, email system 120 can determine whether any newly received emails are reservation emails. As a further example, email system 120 can determine whether any newly received emails are potentially reservation emails. Rebooking system 110 can retrieve the potential reservation emails from email system 120.

Rebooking system 110 can determine whether any of the potential reservation emails are reservation emails.

Consistent with disclosed embodiments, reservation emails can be identified using rules of machine learning. In some embodiments, rebooking system 110 and/or email system 120 can identify reservation emails using rules. For example, emails received from predetermined email addresses can be identified as reservation emails. Such predetermined email addresses can include email addresses associated with online booking agencies or service providers. In various embodiments, rebooking system 110 can identify reservation emails using machine learning (e.g., using a neural network). For example, email system 120 can identify potential reservation emails using rules and rebooking system 110 can then retrieve potential reservation emails and identify reservation emails using a neural network.

In step 209, described in greater detail below with regard to FIGS. 4A-4C and 5-8, rebooking system 110 can parse the reservation email. This parsing can be performed on the computer code (e.g., the HTML or XML) describing the reservation email. The parsing can be performed using a machine learning algorithm, such as a neural network. In some embodiments, the parsing can include filtering the computer code of the reservation email to identify potential reservation parameters. The parsing can further include creating one or more feature vectors for each potential reservation parameter. The feature vectors can then be input into one or more corresponding neural networks to generate assessment values. Based on the assessment values, rebooking system 110 can determine the reservation parameters for the reserved inventory item.

As used herein, reservation parameters may differ depending on the good or service reserved. With respect to accommodation reservations, reservation parameters can include check-in date, check-out date, price, currency of price, tracking or confirmation number of reservation, hotel address, hotel name, hotel reputation (e.g., 1-star hotel, 2-star hotel, etc.), number of beds in room (e.g., number of cots, sofa beds, twin-sized beds, full-sized beds, queen-sized beds, king-sized beds, etc.), room type (e.g., single, double, triple, quad, etc.), smoking or non-smoking room, room description, number of people in reservation (e.g., number of infants, children, adults, seniors, etc.), conditions on cancellation (without penalty, with penalty or with penalty after date, non-refundable, etc.), number of nights reserved, whether prepaid or not, room size (e.g., 250 square feet), room amenities (fireplace, balcony, hot tub, etc.), view, meals included (e.g., breakfast), wireless network connections included, or similar parameters describing a room and the services provided with an accommodation. Likewise, reservation parameters for travel reservations may include carrier (e.g., AMTRAK, DELTA, CONTINENTAL, etc.), itinerary (e.g., origin, destination, stopovers, etc.), a travel class (e.g., first class, business class, coach, etc.), whether meals are served, number of stops, travel time, or similar parameters describing a travel experience. As an additional example, reservation parameters for entertainment reservations may include location (e.g., entertainment venue name), activity (e.g., baseball game, concert, meal, or amusement park ride), seat number/location, seating class (VIP, reserved seating, general admission, etc.) or similar parameters describing an entertainment experience. As would be realized by one of skill in the art, this description of reservation parameters is not intended to be limiting.

In step 211, rebooking system 110 can query new booking system 130 to identify available inventory items. This query can depend, in part, on the reservation parameters parsed from the reservation email in step 209. In some embodiments, rebooking system 110 can be configured to limit the query to inventory provided by the same service provider (e.g., the same hotel or same hotel operator, the same flight or same airline, the same restaurant). In various embodiments, rebooking system 110 can be configured to limit the query to inventory with a lower price than the reserved inventory item. The ability of rebooking engine 110 to selectively retrieve inventory information can depend on the new booking engine 130. For example, different online booking agencies can provide different degrees of selectivity in retrieving inventory information. Rebooking system 110 can be configured to communicate with new booking engine 130 to retrieve inventory using an API (e.g., PRICELINE PARTNER NETWORK API, QPX EXPRESS API, SABRE API, etc.).

In step 213, as described in greater detail below with regard to FIG. 9, rebooking system 110 can determine one or more similar inventory items. In some embodiments, rebooking system 110 can use a machine learning system to determine one or more similar inventory items. For example, rebooking system 110 can use a neural network to extract inventory parameters from the available inventory items from step 211. In some aspects, inventory parameters can describe the available inventory items just as reservation parameters can describe the reserved inventory item. For example, inventory parameters can describe accommodation inventory, travel inventory, and entertainment inventory just as the reservation parameters listed above can describe accommodation reservations, travel reservations, and entertainment reservations. In some embodiments, rebooking system 110 can be configured to limit the determination to inventory provided by the same service provider (e.g., the same hotel or same hotel operator, the same flight or same airline, the same restaurant). In various embodiments, rebooking system 110 can be configured to limit the determination to inventory with a lower price than the reserved inventory item. Rebooking system 110 can be configured to generate comparison vectors for the available inventory items using at least one of the available inventory items and inventory parameters; and at least one of the reservation email and reservation parameters. The comparison vectors can be input to a neural network to generate similarity values. Rebooking system 110 can be configured to determine the one or more similar inventory items based on the similarity values.

In step 215, rebooking system 110 can notify the user of a rebooking opportunity. In some embodiments, this notification can indicate at least one similar inventory item. This at least one similar inventory idea can be a subset of the one or more similar inventory items determined in step 213. In some aspects, the at least one similar inventory item can cost less than the reserved inventory item. Alternatively or additionally, the at least one similar inventory item can have a better reputation than the reserved inventory item (e.g., rooms at 4-star hotels when the reserved inventory item is a room at a 2-star hotel). This notification can be provided using an email, text message, IM, automated phone call, or other communication. For example, as described in greater detail below with regard to FIGS. 10A and 10B, rebooking system 110 can send an email to the account of the user hosted on email system 120. As an additional example, rebooking system 110 can sent an instant message (e.g., a Short Message Service (SMS) message, Extended Message Service (EMS) message, or Multimedia Messaging Service (MMS) message) to a phone number of the user.

In step 217, rebooking system 110 can receive a rebooking request from the user. This rebooking request can be received in response to the indication provided in step 215. This rebooking request can indicate a similar inventory item selected by the user. When the indication provided in step 215 comprises an email, the user can provide this rebooking request by interacting with email system 120. For example, the user can reply to the email message using email system 120, according to methods known in the art. As an additional example, the user can select a control embedded in the email that automatically generates and provides a response to rebooking system 110. When the indication provided in step 215 comprises an instant message, the user can provide a rebooking request by responding to the instant message. As would be appreciated by one of skill in the art, these exemplary methods of providing a rebooking request are not intended to be limiting.

In step 219, rebooking system 110 can provide to new booking system 130 a request to reserve the similar inventory item selected by the user. Rebooking system 110 can provide the request using a script executing on a web browser, or can provide the reservation request using an API exposed by new booking system 130. Rebooking system 110 can indicate in the reservation request the inventory parameters of the similar inventory item selected by the user. In this manner, rebooking system 110 can cause new booking system 130 to reserve the similar inventory item selected by the user.

In step 221, new booking engine 130 can be configured to provide a confirmation of the reservation request. This confirmation can be provided to rebooking engine 110 directly, as shown in FIG. 2. Alternatively or additionally, a confirmation can be sent to the user. For example, a confirmation can be sent in a reservation email to the user. Such a reservation email can be sent to the email account of the user hosted on email system 120. This email could then be retrieved by rebooking system 110 in the normal course of operation (as in step 205). By this indirect method, rebooking system 110 can receive an indication of a successful reservation, while also priming rebooking system 110 to identify any additional price drops, should one or more additional similar inventory items at even lower prices become available.

In step 223, as described in greater detail below with regard to FIG. 12, rebooking system 110 can generate a cancellation script. In some embodiments, rebooking system 110 can be configured to generate a cancellation script by parameterizing a cancellation function. For example, the cancellation function can include placeholders for reservation parameters needed to cancel the reservation, such as the email address of the user, or the confirmation number associated with the reserved inventory item. Rebooking system 110 can be configured to replace such placeholders with the appropriate values for the reservation being cancelled. For example, when the confirmation number associated with the reserved inventory item is "41982389f0421," rebooking system 110 can be configured to replace the placeholders for confirmation number in the cancellation function with the value "41982389f0421."

In step 225, as described in greater detail below with regard to FIG. 11, rebooking system 110 can execute the cancellation script on a cancellation device (not shown). In some aspects, the cancellation device can be a virtual machine or a computing device. In some embodiments, the cancellation device can be a component of rebooking system 110. The cancellation device can provide a cancellation request to prior booking system 140 according to the cancellation script. In some aspects, the cancellation device can interact with an API exposed by prior booking system 140 to cancel the reservation. For example, the cancellation device can interact with a web interface exposed by prior booking system 140 to cancel the reservation (e.g., a web interface similar to those available at www.orbitz.com, www.hotwire.com, www.hotels.com, or similar websites). As described in detail below, the cancellation device can be configured such that the cancellation request appears to originate from a computing device of the user.

Rebooking system 110 can create or select the cancellation device to match a stored device configuration. The stored device configuration can be a configuration of a computing device of the user. The stored device configuration can include, for example, the operating system, browser, and browser version of the computing device of the user. In some aspects, the cancellation device can be a virtual machine that matches the stored device configuration. For example, rebooking system 110 can create or select a virtual machine with an operating system, browser, and browser version matching the stored device configuration. In various aspects, the cancellation device can be a computing device matching the stored device configuration. In some aspects, this computing device can be of the same make and model as the computing device of the user. For example, when the stored device configuration describes an iPhone 7, the cancellation device can be an iPhone 7. Rebooking system 110 can be configured to remotely connect to the cancellation device (e.g., the iPhone 7) to execute the cancellation script. In this manner, the cancellation request can appear to be originating from the computing device of the user. Alternatively, for example when a stored device configuration is unavailable, rebooking system 110 can be configured to use a cancellation device having a device configuration randomly selected from a distribution of possible device configurations. This distribution of possible device configurations can be an observed distribution of device configurations, as measured by NETMARKETSHARE, STATCOUNTER, or a similar provider of internet usage statistics.

Rebooking system 110 can be configured to proxy network traffic concerning the cancellation request through a proxy server. In some embodiments, this proxy server can be a component of rebooking sytem 110. This proxy server can have an IP address resembling a stored IP address (e.g., an IP address in a subnet range similar to that of the stored IP address). The stored IP address can be the IP address of a computing device of the user. In various aspects, the proxy server can have a similar geographic location to the computing device of the user. In this manner, the cancellation request can appear to be coming from the location of the user. Alternatively, for example when a stored IP address is unavailable, rebooking system 110 can be configured to select a proxy server at random.

In step 227, prior booking system 140 can indicate that the reservation of the reserved inventory item has been cancelled. For example, prior booking system 140 can provide a confirmation email indicated cancellation of the reservation. Rebooking system 110 may be configured to receive this confirmation email directly, for example when rebooking system 110 interacts with prior booking system 140 using an API to cancel the reservation of the reserved inventory item. In various embodiments, prior booking system 140 can send the confirmation email to an email account of the user. For example, prior booking system 140 can send the confirmation email to the email account of the user hosted on email system 120. In embodiments that require rebooking system 110 to obtain confirmation of rebooking, this email could then be retrieved by rebooking system 110 in the normal course of operation (as in step 205).

As described above, in some embodiments, system 100 can be configured to use neural networks to identify reservation emails (step 207), parse reservation emails (step 209), and identify rebooking opportunities (step 213). The neural networks used for each of these processes can be trained using supervised learning. For example, human users can label emails as reservation emails or not reservation emails. These labeled emails can be used to train neural networks for step 207. As another example, described in detail below with regards to FIG. 7, human users can identify reservation parameters present in a reservation email and provide values for those reservation parameters. These emails can then be used to train neural networks for step 209. As a further example, human users can identify the available inventory item as similar to, or dissimilar from, the reserved inventory item. These labeled pairs, including the available inventory item and the reserved inventory item, can be used to train neural networks for step 213. The neural networks described herein can be trained occasionally using accumulated training data.

In some embodiments, rebooking system 110 can be configured to monitor metrics concerning reservation email identification, reservation email parsing, and rebooking opportunity identification. As a non-limiting example, rebooking system 110 can be configured to monitor at least one of the following probabilities: the probability that an email is a reservation email, the probability that the parser extracts a particular reservation parameter from the reservation email, the probability that at least one rebooking opportunity is identified, and the probability that the user accepts the rebooking opportunity.

The monitored metrics can be used to determine when the neural networks require retraining. For example, a sudden change in a metric can indicate that the associated neural network requires retraining. Such a change may occur, for example, when a neural network responsible for identifying reservation emails cannot recognize a new reservation emails format. The neural network can then be retrained using reservation emails in the new format until such emails are reliably recognized.

As would be appreciated by one of skill in the art, the particular order and arrangement of steps disclosed in FIG. 2 is not intended to be limiting. For example, steps can be re-arranged or combined without departing from the envisioned embodiments. Steps can be divided into sub-steps that can be performed in a different order, or by different components of system 100. Furthermore, additional steps may be added or steps may be removed without departing from the envisioned embodiments.

Reservation Email Identification

Figure 3A:
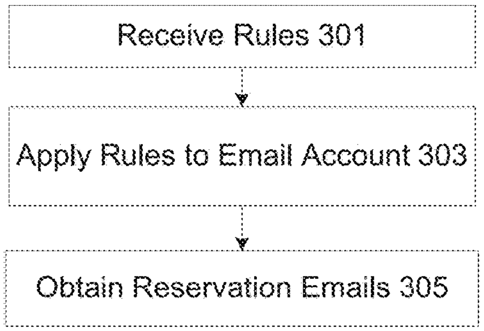
FIGS. 3A and 3B are flowcharts of exemplary reservation identification processes.
Figure 3B:
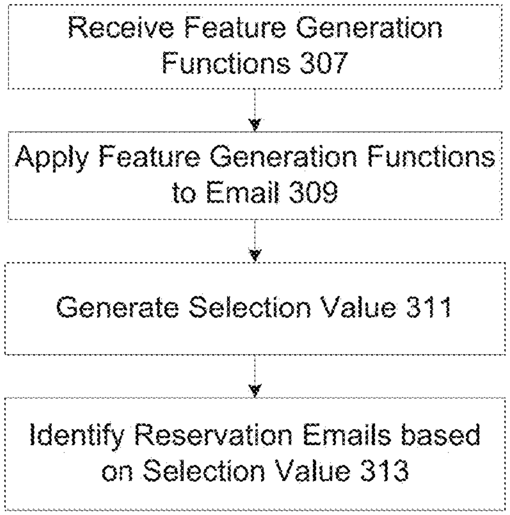

FIGS. 3A and 3B depict flowcharts of exemplary reservation identification processes, consistent with disclosed embodiments. Consistent with disclosed embodiments, these identification processes can be performed at least in part by email system 120, rebooking system 110, or a third-party system. This flexibility allows system 100 to interact with a variety of email systems that expose differing functionality through APIs, to manage the computing resources required by rebooking system 110, and to address the concerns of users that may not wish to have non-travel related emails forwarded or copied to rebooking system 110.

According to the method depicted in FIG. 3A, one or more of email system 120 and rebooking system 110 can identify emails in an account of a user on email system 110 as reservation emails using rules. In step 301, rebooking system 301 can be configured to receive the rules. The rules can comprise keywords, search parameters (e.g., read/unread status, field to search, mailbox to search, presence of attachments, email size), regular expressions, or similar rules known to one of skill in the art. In some embodiments, the rules can include a list of email addresses that are known senders of reservation emails. For example, these email addresses may be used by online booking agents or service providers to send reservation emails, or accommodation-related, travel-related, and/or entertainment-related emails to the accounts of users.

In step 303, one or more of email system 120 and rebooking system 110 can apply these rules to the email account of the user. In some embodiments, according to methods known in the art, one or more mailboxes of the user (e.g., an inbox, junk mail, deleted folder, or other mailbox of the user) can be searched for emails satisfying the rules. For example, in response to a query from rebooking system 110, email system 120 can search the mailbox of the user for emails sent by senders having email addresses matching those in a predetermined list of email addresses. In step 305, rebooking system 110 can obtain the resulting matching emails from email system 120.

In various embodiments, the order of steps 303 and 305 can be reversed. For example, rebooking system 110 can be configured to retrieve at least some new emails from one or more mailboxes of the user (as in step 305) and then apply the rules to these retrieved emails (as in step 303). In some embodiments, system 100 can be configured to combine these approaches. For example, email system 120 can be configured to provide to rebooking system 110 emails satisfying one or more coarse filtering rules (e.g., based on the email address of the sender), and rebooking system 110 can further filter the retrieved emails based on one or more fine filtering rules (e.g., the results of regular expressions applied to the subject line or text of the retrieved emails). In some embodiments, rebooking system 110 can be configured to process the obtained reservation emails as described above with regards to step 209 of FIG. 2.

As would be appreciated by one of skill in the art, the particular order and arrangement of steps disclosed in FIG. 3A are not intended to be limiting. For example, steps can be re-arranged or combined without departing from the envisioned embodiments. Steps can be divided into sub-steps that can be performed in a different order, or by different components of system 100. Furthermore, additional steps may be added or steps may be removed without departing from the envisioned embodiments.

According to the method depicted in FIG. 3B, emails in an account of a user on email system 110 can be identified for parsing by rebooking system 110 using a neural network. The emails can be converted to feature vectors, which can be input to the neural network to generate a selection value. Emails with selection scores exceeding a predetermined threshold can be identified as reservation emails.

In step 307, rebooking system 307 can be configured to receive feature-generating functions. The feature-generating functions of FIG. 3B can take an email as input and provide one or more features as an output. The features of FIG. 3B can be numbers. These numbers can be continuous or discrete-valued, and can represent numerical values (e.g., price), logical values (e.g., Booleans represented by one or zero), or categorical information (e.g., day of the week, day of the month, month of the year, day of the year, etc.). The features of FIG. 3B can include any characteristic of an email that might influence the chance of the email being a reservation email, whether considered alone (e.g., whether the email sender address, or a portion of the email sender address, matches a known email address, or portion of a known email address, previously used to send reservation emails), or in combination with other characteristics of the email (e.g., whether a variant of the word “confirmation” appears in the email within a certain number of word of a variant of the word “reservation”). An exemplary, non-limiting list of additional features includes: whether the body of the email includes words in a predetermined list of terms (e.g., “confirmation number”, “booking number”, etc.); whether the body of the email includes an address for a known service provider (e.g., a hotel or venue address); whether the subject line of the email includes words in a predetermined list of terms (e.g., “trip,” “stay”, “reservation”, etc.); and whether the email address of the sender includes tokens in a predetermined list of tokens (e.g., “hhonors”, “hiltonhonors.com”, “starwoodhotels,” etc.).

In step 309, one or more of email system 120 and rebooking system 110 can apply the feature-generating functions to emails received by the user. For example, email system 120 can apply the feature-generating functions to emails in the account of the user. The emails can be in one or more mailboxes of the user (e.g., an inbox, junk mail, deleted folder, or other mailbox of the user). Email system 120 can be configured to apply the feature-generating functions following a query from rebooking system 110. Email system 120 can be configured to provide the feature values for the emails to rebooking system 110. As an additional example, rebooking system 110 can apply the feature-generating functions to emails retrieved from email system 120. In this example, rebooking system 110 can be configured to retrieve emails satisfying one or more query criteria (e.g., based on the domain of the sender email address). These emails can be retrieved from one or more mailboxes of the user (e.g., an inbox, junk mail, deleted folder, or other mailbox of the user).

In step 311, rebooking system 110 can generate selection values for emails. These selection values can be determined based on the feature values for the emails. Rebooking system 110 can be configured to create a feature vector for each email based on the features values for the email. For example, rebooking system 110 can be configured to create the feature vector for an email by concatenating the feature values for the email. Rebooking system 110 can be configured to input the feature vectors for the emails to a neural network to calculate selection values for the emails. The neural network can include an input layer that takes the values of a feature vector. A hidden layer can receive inputs from each of the input layers and output a value based on the values of these inputs. This value can depend on a weighted sum of the input values and an offset. For example, the value can be a function of the weighted sum of the input values and an offset. The neural network can include multiple hidden layers, each receiving input from the preceding hidden layer. An output layer can include a single selection value. This selection value can depend on a weighted sum of the input values to the output layer and an offset for this output layer. For example, the selection value can be a function of the weighted sum of the input values and an offset. In some embodiments, the neural network can be configured such that the selection value takes a value between zero and one. As would be appreciated by one of skill in the art, other neural network architectures can be used and the architecture above is exemplary and not intended to be limiting.

In step 313, rebooking system 110 can be configured to identify reservation emails based on selection values. In some embodiments, rebooking system 110 can be configured to consider potential reservation parameters having selection values greater than a predetermined threshold. For example, when the predetermined threshold is 0.5, rebooking system 110 may be configured to identify as a reservation email any email with a selection values less than 0.5. In some embodiments, rebooking system 110 can be configured to process emails identified as reservation emails as described above with regards to step 209 of FIG. 2.

As would be appreciated by one of skill in the art, the particular order and arrangement of steps disclosed in FIG. 3B are not intended to be limiting. For example, steps can be re-arranged or combined without departing from the envisioned embodiments. Steps can be divided into sub-steps that can be performed in a different order, or by different components of system 100. Furthermore, additional steps may be added or steps may be removed without departing from the envisioned embodiments.

Reservation Email Parsing

FIGS. 4A-4C illustrate a technical problem with automated rebooking that is addressed by the envisioned systems and methods. FIG. 4A depicts an exemplary reservation confirmation email as it would be displayed to a human user. As displayed, a human user has little difficulty identifying the pertinent reservations parameters (e.g., check-in date and time, check-out date and time, hotel address, confirmation number. But an automated reservation system does not identify the pertinent reservation parameters in the same manner as a human user. FIG. 4B depicts the reservation confirmation email of FIG. 4A as it would be parsed by an automated reservation system. This exemplary computer code, when processed by the computing device of the user, generates the image displayed in FIG. 4A. To enable correct functioning of the automated rebooking system, reservation parameters presented in this exemplary computer code must be identified and the correct values of these reservation parameters must be assigned, as shown in FIG. 4C.

A conventional approach to identifying reservation parameters may rely on foreknowledge of the exact structure of the confirmation email sent by an online booking agency or service provider. For example, customized rules can be used to extract reservation parameters (e.g., using an XML query language like XPATH) from a reservation email when the exact template (e.g., HMTL or XML template) of the reservation email is known. But implementing an automated rebooking system using this conventional approach can be difficult.

Because the content of reservation emails can be dynamically generated, reservation emails generated according to known templates can vary in structure. This variation can prevent the conventional approach from successfully identifying reservation parameters. Furthermore, online booking agencies and service providers often update templates for the reservation emails. Each update can prevent the conventional approach from successfully identifying reservation parameters, requiring rewriting of the customized rules. Furthermore, a set of customized rules may be required for each template used by each online booking agency or service provider, severely increasing maintenance requirements for system 100 and limiting the number of online booking agencies and service providers system 100 can accommodate.

The disclosed systems and methods, in some embodiments, can use machine learning to develop a parser capable of extracting reservation parameters from reservation emails with dynamically generated content. Such a parser can also accommodate changes in templates. In some embodiments, such a parser can accommodate multiple booking agencies and service providers, or specific versions of a parser can be trained to accommodate one or more different booking agencies and service providers. For example, a parser can be trained to only extract parameters from reservation emails sent by ORBITZ.COM, or trained to extract parameters from reservation emails sent by HOTELS.COM and by HOTWIRE.COM. Thus this machine learning approach improves upon conventional approaches, overcoming technical problems with those conventional approaches that hinder automatic rebooking systems.

Figure 5:
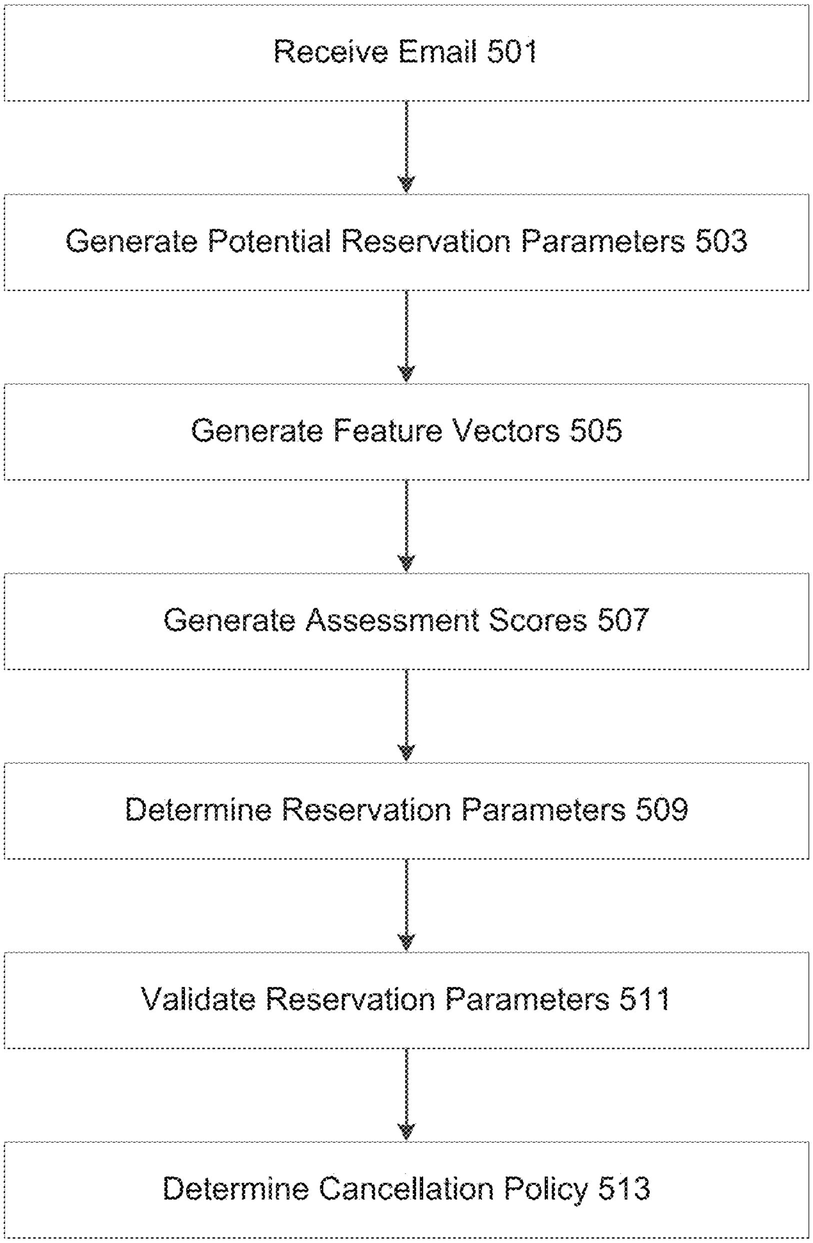
FIG. 5 is a flowchart of an exemplary reservation parsing process.

FIG. 5 depicts a flowchart of an exemplary reservation parsing process, consistent with disclosed embodiments. As described in greater detail below, the envisioned systems and methods generate potential reservation parameters from the reservation email in step 503 and determine reservation parameters for the reserved inventory item from the potential reservation parameters (and optionally the reservation email) using neural networks in steps 505-509. In some embodiments, the envisioned systems and methods can additionally validate these reservation parameters. In various embodiments, the envisioned systems and methods can infer a cancellation policy using at least some of the reservation email. For example, a cancellation feature vector can be generated based on the entire email and provided to a cancellation neural network. This cancellation neural network can determine a type of cancellation policy based on the cancellation feature vector. In this manner, system 100 can use a specific implementation of machine learning to extract reservation parameters from a reservation email.

In step 501, rebooking system 110 can receive a reservation email. As described above, rebooking system 110 can be configured to retrieve the reservation email from email system 120, or a third party system that in turn retrieves the reservation email from email system 120.

In step 503, rebooking system 110 can generate potential reservation parameters. These potential reservation parameters can correspond to reservation parameters that describe the reserved inventory item. The correspondence between reservation parameters and potential reservation parameters can be many-to-many. For example, each potential reservation parameter can correspond to multiple reservation parameters and each reservation parameter can correspond to zero, one, or multiple potential reservation parameters. For example, a date in a reservation email could potentially be a "check-in date" reservation parameter or a "check-out date" reservation parameter. Likewise, a numeric value in a reservation email could potentially be a "number of beds" reservation parameter, a "number of adults" reservation parameter, or a "number of nights" reservation parameter. The date and the numeric value can therefore be potential reservation parameters and can each correspond to multiple reservation parameters.

Rebooking system 110 can be configured to generate potential reservation parameters by filtering the reservation email. This filtering can be performed on the computer code defining the reservation email (e.g., the computer code shown in FIG. 4B). System 110 can be configured to filter the reservation email to reduce the number of potential reservation parameters input to the machine learning stage of the parser. As would be appreciated by one of skill in the art, reservation emails can contain a lot of information. Filtering can reduce the computational resources required by, and the complexity of, the neural networks used to extract the reservation parameters.

Rebooking system 110 can be configured to filter the reservation email by applying filtering rules for each reservation parameter (e.g., price, check-in date, number of occupants) to the reservation email. These filtering rules can depend on the format of information in the email. For example, a filtering rule for check-in date can be satisfied by anything that appears to be a date, or a filtering rule for price can be satisfied for anything that appears to be a price. Each reservation parameter can be associated with multiple rules. In some embodiments, rebooking system 110 can be configured to require that potential reservation parameters satisfy all of these multiple rules. In various embodiments, rebooking system 110 can be configured to require that potential reservation parameters satisfy at least some of these multiple rules. Rebooking system 110 can be configured to use regular expressions, address parsing libraries, date parsing libraries, or similar rules to filter the reservation email.

In steps 505-509, rebooking system 110 can determine reservation parameters for the reserved inventory item using neural networks. In some embodiments, rebooking system 110 can be configured with a separate neural network for each reservation parameter. Rebooking system 110 can use the neural network for a reservation parameter to generate assessment values for each potential reservation parameter corresponding to that reservation parameter. For example, rebooking system 110 can be configured with a first neural network for determining a first reservation parameter and a second neural network for determining a second reservation parameter. Given a potential reservation parameter corresponding to both the first reservation parameter and the second reservation parameter, rebooking system 110 can be configured to (i) use the first neural network to determine a first assessment score of the potential reservation parameter for the first reservation parameter and (ii) use the second neural network to determine a second assessment score of the potential reservation parameter for the second reservation parameter. Rebooking system 110 can determine whether the potential reservation parameter is the first reservation parameter based on the first assessment score. This determination can involve comparing the first assessment score to other assessment scores generated using the first neural network for other potential reservation parameters corresponding to the first reservation parameter. Similarly, rebooking system 110 can determine whether the potential reservation parameter is the second reservation parameter based on the second assessment score. Thus rebooking system 110 can determine whether the potential reservation parameter is (i) the first reservation parameter, (ii) the second reservation parameter, or (iii) neither reservation parameter. The process of generating assessment score and determining reservation parameters is described in greater detail below.

In step 505, rebooking system 110 can generate feature vectors for the potential reservation parameters. Consistent with disclosed embodiments, for each reservation parameter a feature-generating function can exist that generates a feature vector from a potential reservation parameter. Because multiple reservation parameters can correspond to a single potential reservation parameter (e.g., a date may be the check-in date, the check-out date, or an irrelevant date), multiple feature vectors can be generated for each potential reservation parameter. The features comprising these vectors can be numbers. These numbers can be continuous or discrete-valued, and can represent numerical values (e.g., price), logical values (e.g., Booleans represented by one or zero), or categorical information (e.g., day of the week, day of the month, month of the year, day of the year, etc.). Features can include any characteristic of a potential reservation parameter that might influence the chance of the value being correct, whether considered alone (e.g., whether an amount is within a range of plausible prices, whether a text string is a valid address), in combination with other potential reservation parameters (e.g., whether a potential check-out date is the latest date among the potential reservation parameters, whether a potential check-in date is the second latest date among the potential reservation parameters), or in combination with other information in the reservation email (e.g., the number of words between a value and a relevant keyword). An exemplary, non-limiting list of features includes: the number of words in the reservation email between a date and the term "check-in date" (or variants thereof).; whether a text string is within a predetermined number of words from one of a predetermined list of terms (e.g., "confirmation number", "booking number", etc.); the length of a potential confirmation number; whether a character string is in a common format for US phone numbers (e.g., "XXX.XXX.XXXX" or "(XXX) XXX-XXXX"); and where a value sits among a range of possibilities (greatest, least, etc.).

For example, assuming that the parser has identified "5850-7134-9691", "17184325473", and "ESFSX" as potential confirmation numbers, the feature-generating function can determine the following features for each of these potential confirmation numbers: whether length is between 6 and 15 characters; whether it is a common phone number format such as a US phone number; the distance in the email from the keywords "confirmation number", "booking number"; etc. The values for these features can be combined with other features to generate feature vectors, as described below with regard to FIG. 6.

In step 507, rebooking system 110 can be configured to generate assessment values based on the feature vectors using a neural network. The neural network can include an input layer that takes the values of the feature vector. A hidden layer can receive inputs from each of the input layers and output a value based on the values of these inputs. This value can depend on a weighted sum of the input values and an offset. For example, the value can be a function of the weighted sum of the input values and an offset. The neural network can include multiple hidden layers, each receiving input from the preceding hidden layer. An output layer can include a single assessment value. This assessment value can depend on a weighted sum of the input values to the output layer and an offset for this output layer. For example, the assessment value can be a function of the weighted sum of the input values and an offset. A feature vector can be input to the neural network to calculate an assessment value for that feature vector. In some embodiments, a different neural network can be used for each reservation parameter, such as the number of nodes in the input layer and the number of nodes in each of the one or more hidden layers. The weights and offsets can differ between these neural networks. In some embodiments, these neural networks can be configured such that the assessment values take values between zero and one. As would be appreciated by one of skill in the art, other neural network architectures can be used and the architecture above is exemplary and not intended to be limiting.

In step 509, rebooking system 110 can be configured to determine reservation parameters based on the assessment values. In some embodiments, rebooking system 110 can be configured to consider potential reservation parameters having assessment values greater than a predetermined threshold. For example, when the predetermined threshold is 0.5, rebooking system 110 may be configured to reject as a reservation parameter any potential reservation parameter with an assessment value less than 0.5. As potential reservation parameters can be associated with multiple assessment values, a potential reservation parameter can be rejected for one reservation parameter and considered for another reservation parameter. For example, a date may have an assessment value of 0.8 for a check-in date and 0.4 for a check-out date. Rebooking system 110 can reject this date as a potential check-out date and consider this date as a potential check-in date. When there are multiple potential reservation parameters with assessment values greater than the predetermined threshold for a reservation parameter, rebooking system 110 can be configured to select the potential reservation parameter with the highest assessment value as the reservation parameter. When there exist no potential reservation parameters for a reservation parameter, because no potential reservation parameters were selected or no selected potential reservation parameters had assessment values greater than a threshold value, rebooking system 110 can set the reservation parameter to a default value (e.g., zero). In some embodiments, the predetermined thresholds for different reservation parameters can differ. In various embodiments, the predetermined threshold for the different reservations parameters can be the same.

In optional step 511, rebooking system 110 can be configured to validate reservation parameters. For example, rebooking system 110 can choose a text string as a "hotel name" reservation parameter, or as a "hotel address" reservation parameter based on assessment values. In step 511 rebooking system can be configured to verify that a hotel exists with that name (or a variation of that name) or that a hotel exists at that address (or a variation of that address). As an additional example, rebooking system 511 can confirm that a "reservation phone number" reservation parameter matches a phone number for the hotel. In some embodiments, rebooking system 110 can be configured to evaluate the validity of the reservation parameters with respect to other reservation parameters. For example, rebooking system 110 can be configured to determine whether a "check-in date" reservation parameter is before a "check-out date" reservation parameter, and whether a "number of nights" reservation parameter (if available) equals a difference between the "check-in date" reservation parameter and the "check-out date" reservation parameter. One of skill in the art would appreciate that many other consistency and validation checks are possible, and that the checks listed above are not intended to be limiting.

In option step 513, rebooking system 110 can be configured to determine a cancellation policy for the reservation. Consistent with disclosed embodiments, similar to the process described above with regard to step 505, rebooking system 110 can be configured to generate a cancellation feature vector based on the content of the whole reservation email. This cancellation feature vector can be input to a cancellation neural network comprising an input layer, one or more hidden layers, and an output layer, similar to the neural networks used to generate assessment values and described above with regard to step 507. The output of this cancellation neural network can be an indication of the cancellation policy. As a non-limiting example, the cancellation neural network can distinguish between whether the reservation is cancellable without penalty, with penalty, with penalty after a certain date, or non-refundable. In this example, the output layer of the cancellation neural network can include four nodes, each corresponding to one of the four possible cancellation policies. The value generated by the cancellation neural network for each of the four nodes can indicate the relative probability of the associated cancellation policy being the cancellation policy for the reservation. As would be appreciated by one of skill in the art, other configurations are possible.

The following pseudocode shows how an email may be parsed using machine learning to identify reservation parameters (described as fields) including "check_in_date", "total_price", and "confirmation_number." As shown, according to the pseudocode, the "parse" function returns a reservation data structure including the parsed reservation parameters.

```
parse(email):
 reservation = { }
 fields = ['check_in_date', 'total_price', 'confirmation_number', ...]
 for each field in fields:
  feature_vectors = build_feature_vectors_for_field(email, field)
  classifier = classifier_for_field(field)
  # the values associated with feature vectors that score high enough get
  # added to the reservation.
  for each feature_vector in feature_vectors:
   if classifier.predict(feature_vector) > 0.5:
    # NOTE: Can also pick the highest predicted value over threshold.
    reservation.add_value_for_field(feature_vector.value, field)
  return reservation
```

As would be appreciated by one of skill in the art, the particular order and arrangement of steps disclosed in FIG. 5 is not intended to be limiting. For example, steps can be re-arranged or combined without departing from the envisioned embodiments. Steps can be divided into sub-steps that can be performed in a different order, or by different components of system 100. Furthermore, additional steps may be added or steps may be removed without departing from the envisioned embodiments.

Figure 6A:
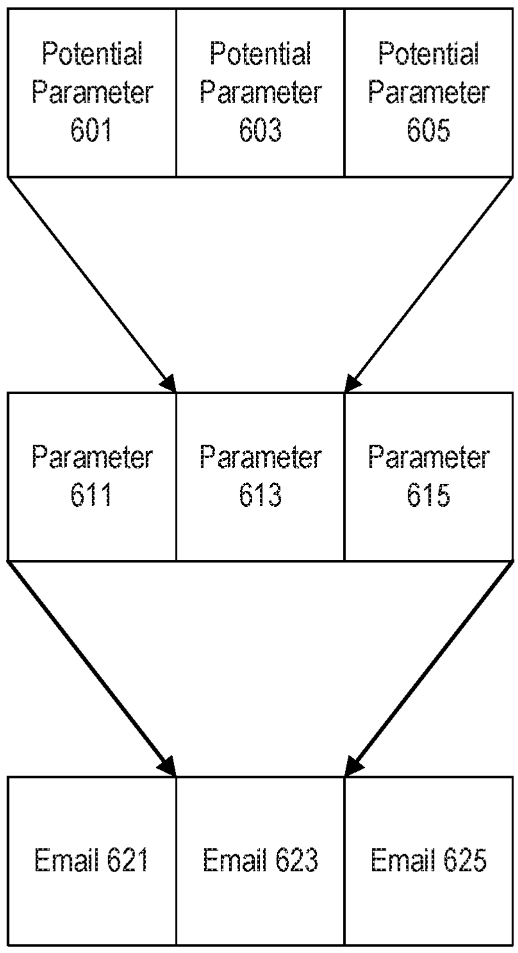

FIGS. 6A and 6B depict exemplary data structures and pseudocode for use in reservation parsing, consistent with disclosed embodiments. As discussed above, with regard to FIG. 5, multiple potential reservation parameters (e.g., potential parameter 601—potential parameter 605) can be filtered out of the reservation email for each reservation parameter (e.g., parameter 611—parameter 615). Likewise, each reservation email processed by rebooking system 110 can include multiple reservation parameters. The pseudocode depicted in FIG. 6B indicates how a feature vector can be created with values for features, and how multiple such feature vectors can be associated with different reservation parameters (e.g., confirmation number, check-in date. etc.) As would be appreciated by one of skill in the art, this particular data structure is not intended to be limiting.

Figure 7:
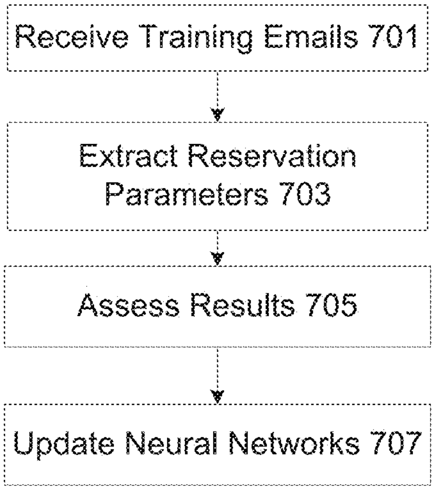
FIG. 7 depicts a flowchart of an exemplary method for training a neural network used for reservation parsing.

FIG. 7 is a flowchart of an exemplary method for training a neural network used for reservation parsing, consistent with disclosed embodiments. Rebooking system 110 can be configured to train the neural networks used to parse reservation parameters from reservation emails. In some embodiments, rebooking system 110 can be configured to train these neural networks prior to use in system 100. In various embodiments, rebooking system 110 can be configured to periodically retrain the neural networks while system 100 is in operation. In some embodiments, this may be supervised learning. In step 701, rebooking system 110 can be configured to receiving training emails. For example, a portion of the emails retrieved by rebooking system 110 from email system 120 can be selected for training. In some embodiments, this proportion can be less than 10%.

In step 703, rebooking system 110 can be configured to extract reservation parameters from the selected reservation emails. These reservation parameters can be selected according to the methods described above with regards to FIG. 5.

In step 705, the results of this extraction process can be assessed by a human user. Correct values and incorrect values can be indicated by the human user. Correct values can be entered and stored with each email.

In step 707, the system can then update the weights and offsets of the neural network according to methods known to one of skill in the art. In some embodiments, using this labeled training data, rebooking system 110 can be configured to repeatedly predict parameter values, compare the predicted parameter values to the human-validated parameter values, and update the weights and offsets of the neural network based on the results of this comparison. This training process can continue until a stopping point is reached. This stopping point may depend on an error rate, a number of training iterations, or an elapsed time.

As would be appreciated by one of skill in the art, the particular order and arrangement of steps disclosed in FIG. 7 is not intended to be limiting. For example, steps can be re-arranged or combined without departing from the envisioned embodiments. Steps can be divided into sub-steps that can be performed in a different order. Furthermore, additional steps may be added or steps may be removed without departing from the envisioned embodiments. One of ordinary skill in the art would recognize that other training methods are possible and the above methods are not intended to be limiting.

FIG. 8 depicts an exemplary graphical user interface for training a neural network used for reservation parsing, consistent with disclosed embodiments. As shown in FIG. 8, given a reservation email, the neural networks of rebooking system 110 can be configured to determine whether a reservation parameter is present and the value of the reservation parameter. For example, a first neural network configured to extract the "number of adults" reservation parameter from the reservation email has determined that (i) this reservation parameter is present in the reservation email and (ii) that the value of this reservation parameter is "2 adults." This value has been confirmed by a human user, as indicated by the value of the "Admin Verified" selector. Likewise, a second neural network configured to extract the "total price" reservation parameter from the reservation email has determined that (i) this reservation parameter is present in the reservation email and (ii) that the value of this reservation parameter is "275.04." This value has also been confirmed by a human user, as indicated by the value of the "Admin Verified" selector.

Using this graphical user interface, correct values can be entered for parsed fields, fields that are erroneously indicated as being present in the reservation email can be deleted, and additional fields that are erroneously indicated as missing in the reservation email can be added and have correct values applied. One of ordinary skill in the art would recognize that other graphical user interfaces for training are possible and the above graphical user interface is not intended to be limiting.

Determining Equivalent Inventory

Different online booking agencies and service providers can display the same inventory differently. For example, the same amenities or features can be described differently by different online booking agencies. A first online booking agency may describe occupancy in terms of adults and children, while another may equivalently describe occupancy in terms of seniors, adults, children, and infants. A first online booking agency may describe a room as including a king-size bed, while another may equivalently describe the room as including a California king-sized bed. A first online booking agency may describe a room as having a skyline view while another may equivalently describe the room as having a city view. A first online booking agency may describe a room as being a suite, while another may equivalently describe the room as including a bedroom and a living room. For this reason, attempting to match reservation features can cause an automatic rebooking system to miss retrieved inventory equivalent to the reserved inventory item.

The envisioned systems and methods improve upon simple matching by using machine learning to identify retrieved inventory equivalent to the reserved inventory item. In some embodiments, this system relies upon supervised learning to determine whether retrieved inventory matches the reserved inventory item. This supervised learning process provides the additional benefit of modeling the weight a user may give to each described difference (for example, a user might consider a difference in the described number of beds or smoking/non-smoking status more relevant to equivalence than a difference in the described view or free Wi-Fi status). In this manner, in some embodiments, the envisioned systems and methods provide a specific implementation of a technical solution to problem affecting automatic rebooking systems.

Figure 9:
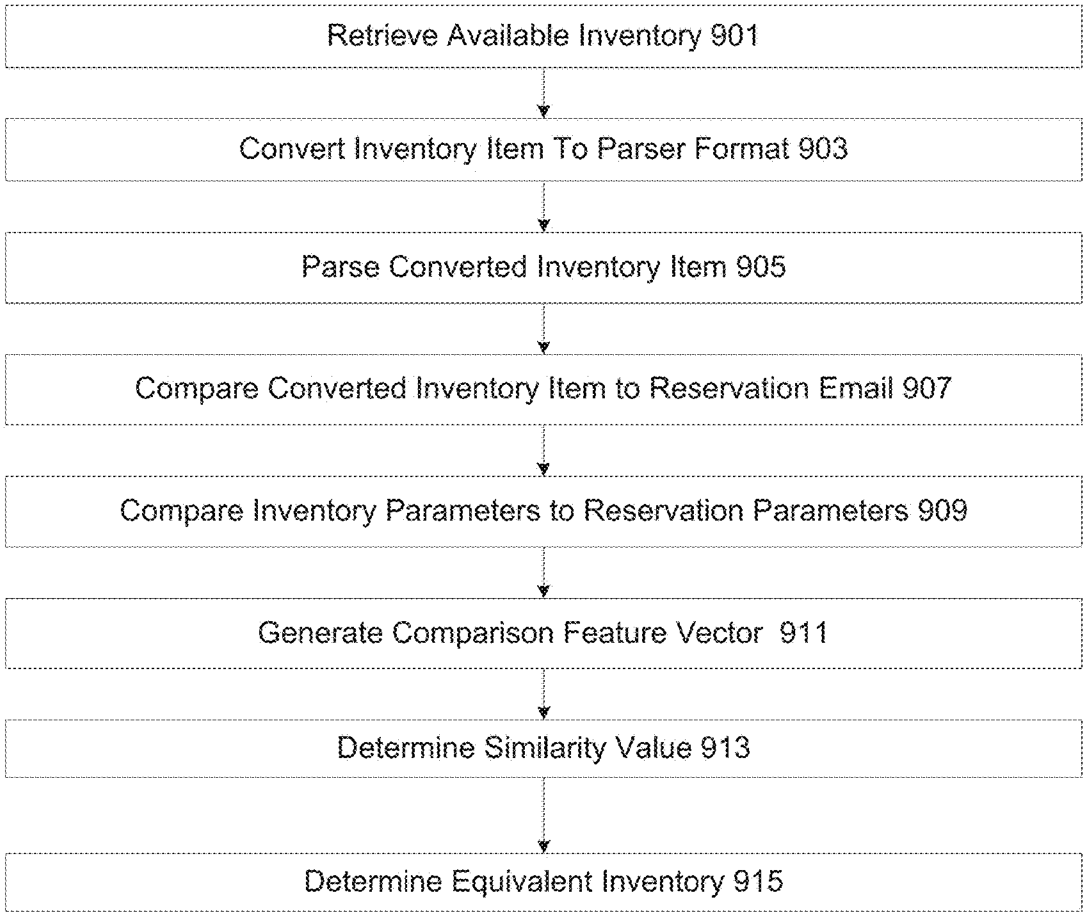
FIG. 9 is a flowchart of an exemplary inventory selection process.

FIG. 9 is a flowchart of an exemplary inventory selection process, consistent with disclosed embodiments. As described in greater detail below, rebooking engine 110 can be configured to determine inventory items similar to the reserved inventory item using neural networks. In some embodiments, the inventory items can be converted into the same format as the reservation email. The inventory parameters can be extracted from the converted inventory items in a manner similar to the extraction of the reservation parameters from the reservation email as described above with regard to FIG. 5. In this manner, the functionality developed for processing the reservation emails can be reused to process the inventory items. This can reduce the effort required to maintaining system 100.

In step 901, rebooking system 110 can retrieve inventory items. In some embodiments, these inventory items can be retrieved from new booking system 130. As described above with regard to step 213 of FIG. 2, rebooking system 110 can be configured to query new booking system 130 using parameters parsed from the reservation email. For example, when the reserved inventory item is a hotel room, rebooking system 110 can be configured to retrieve available hotel rooms in the same city with the same check-in and check-out dates. As an additional example, when the reserved inventory item is a seat on an airline flight, rebooking system 110 can be configured to retrieve available seats on flights with the same origin, destination, and departure date.

In some embodiments, rebooking system 110 can be configured to limit the query to inventory provided by the same service provider, and/or inventory with a lower price than the reserved inventory item. For example, when the reserved inventory item is a hotel room, rebooking system 110 can be configured to retrieve available hotel rooms that are not only in the same city with the same check-in and check-out dates, but also in the same hotel. As an additional example, when the reserved inventory item is a seat on an airline flight, rebooking system 110 can be configured to retrieve available seats on flights that not only have the same origin, destination, and departure date, but also are on the same flight. As would be appreciated by one of skill in the art, other reservation parameters can also be used to limit the query, and the above example is not intended to be limiting.

Rebooking system 110 can be configured to retrieve the inventory items using an API exposed by new booking system 130. Depending on the API and new booking system 130, these inventory items can be retrieved in a format differing from the reservation email. For example, the reservation email may be provided in a markup language such as HTML or XML, while the retrieved inventory items can be JSON objects.

In step 903, rebooking system 110 can convert the retrieved inventory items to the same format as the reservation email. For example, when the reservation email is an HTML document, rebooking system 903 can be configured to convert the retrieved inventory items to HTML.

In step 905, rebooking system 110 can parse the converted inventory items to generate inventory parameters. In some embodiments, as described in greater detail below, parsing a converted inventory item can include filtering the converted inventory item to generate potential inventory parameters, determining the inventory parameters based on assessment values for the potential inventory parameters, optionally validating the inventory parameters, and optionally determining a cancellation policy. In this manner, rebooking system 110 can extract inventory parameters for comparison to the reservation parameters.

Rebooking system 110 can filter the converted inventory items to generate potential inventory parameters in a manner similar to that described with regard to FIG. 5. In some embodiments, rebooking system 110 can use at least some of the same rules for filtering the reservation email and for filtering the converted inventory items. For example, the rules used for filtering the reservation email can be the same as the rules used for filtering the converted inventory items. In various embodiments, rebooking system 110 can be configured to use different rules for filtering the reservation email and for filtering the converted inventory items.

Rebooking system 110 can determine inventory parameters from potential inventory parameters using neural networks in a manner similar to that described with regard to FIG. 5. In some embodiments, at least some of the feature definitions used to generate the feature vectors for determining the reservation parameters can be used to generate inventory feature vectors for determining the inventory parameters. For example, the same feature definitions used to generate the feature vectors for determining the reservation parameters can be used to generate inventory feature vectors for determining the inventory parameters. In various embodiments, rebooking system 110 can be configured to use different feature definitions to generate the feature vectors for determining the reservation parameters and to generate inventory feature vectors for determining the inventory parameters. Rebooking system 110 can input the inventory feature vectors to a neural network in a manner similar to that described with regard to FIG. 5. As described above, the inventory feature vectors can be input to a neural network to generate an assessment value for the potential inventory parameter. In some embodiments, at least some of the neural networks used to generate assessment values for an inventory parameter may be the same as the neural networks used to generate assessment values for the reservation parameter corresponding to the inventory parameter. For example, the same neural network can be used to generate assessment values for a reservation number of beds and for an inventory number of beds. In various embodiments, rebooking system 110 can be configured to use different neural network to generate the assessment values for determining the reservation parameters and for determining the inventory parameters. Rebooking system 110 can determine the inventory parameters based on assessment values in the same manner as rebooking system 110 determines the reservation parameters based on assessment values, as described above with regard to FIG. 5.

Rebooking system 110 can optionally validate the inventory parameters in the same manner as rebooking system 110 validates the reservation parameters, as described above with regard to FIG. 5.

Rebooking system 110 can optionally determine a cancellation policy for an inventory item in the same manner as rebooking system 110 determines a cancellation policy for the reserved inventory item, as described above with regard to FIG. 5.

In step 907, rebooking system 110 can compare the converted inventory item to the reservation email. In some embodiments, one of more features can be extracted based on the HMTL representations of the reservation email and the converted inventory item. For example, one feature can be the number of keywords that are present in both the reservation email and the converted inventory item. These keywords need not be relevant to the reservation parameters, but may be unusual or descriptive words. A feature could be the number of such words that occur in one of the reservation email and the inventory item that also occur in the other of the inventory item and the reservation email.

In step 909, rebooking system 110 can compare the inventory parameters for an available inventory item to the reservation parameters for the reserved inventory item. The available inventory item and the reserved inventory item can share a set of common parameters. For example, the inventory parameters and the reservation parameters can both include parameters such as hotel address, type of bed, number of beds, smoking or non-smoking status. As would be appreciated by one of skill in the art, the set of common parameters can differ between available inventory items. For example, the reserved inventory item can have a "view" reservation parameter with the value "city" and "Wi-Fi" reservation parameter with the value "Free." A first available inventory item can have a "view" reservation parameter but not a "Wi-Fi" reservation parameter. A second available inventory item can have a "Wi-Fi" reservation parameter but not a "view" reservation parameter. The set of common parameters between the reserved inventory item and the first available inventory item can therefore differ from the set of common parameters between the reserved inventory item and the second available inventory item.

Rebooking system 110 can be configured to compare the values for inventory parameters and reservation parameters in the set of common parameters. The result of this comparison can be comparison features. These features can have values that are continuous or discrete-valued, and can represent at least numerical values (e.g., difference in number of beds, difference in occupancy, difference in reputation rating, different in price) and logical values (e.g., matching/non-matching smoking room status, matching/non-matching Wi-Fi, inventory reputation greater than or equal to reservation reputation, inventory price less than or equal to reservation price).

In step 911, rebooking system 110 can generate a comparison feature vector based on the comparisons performed in step 907 and step 909. In some embodiments, this comparison feature vector can include elements corresponding to the features determinable in steps 907 and 909. For example, when 10 features can be determined in step 907 and 50 features can be determined in step 909 then the comparison feature vector can include 60 features. Rebooking system 110 can be configured to initialize the elements of this comparison feature vector to zero (or another default value). Rebooking system 110 can be configured to write the feature values determined in step 907 nd step 909 to the corresponding elements of the comparison feature vector.

In step 913, rebooking system 110 can input the comparison feature vector to a neural network to determine a similarity value. Like the neural networks described above with regard to FIG. 5, this neural network can comprise, in some embodiments, an input layer taking the values in the comparison feature vector, one or more hidden layers with values based on the outputs of the preceding layer, and an output layer comprising a single node. In some embodiments, this output node can take values between zero and one. As would be appreciated by one of skill in the art, other neural network architectures can be used and the architecture above is exemplary and not intended to be limiting.

In a manner similar to the training described with regard to FIG. 7, this neural network can be trained using supervised learning. For example, pairs of inventory items can be labeled "similar" or "not similar" by a human user. In this manner, the envisioned system and methods can benefit from human assessments of similarity. For example, a human trainer can label a hotel room in a first hotel with certain reservation parameters similar to a hotel room in a second hotel with the same or slightly different reservation parameters. A human trainer can also evaluate which differences in reservation features are most important. For example, a human trainer can label a $200 per night hotel room offered by a first service provider equivalent to a nearby $150 per night hotel room offered by a second service provider. Likewise, a human trainer can label a $200 per night hotel room in a four-star hotel equivalent to a $100 per night hotel room in a two-star hotel. These labeled pairs can be used to train a neural network according to methods known to one of skill in the art. Thus human judgments of similarity and the importance of reservation parameters can be incorporated into the neural network.

In step 915, rebooking system 110 can determine similar inventory items based on similarity values for one or more inventory items. In some embodiments, rebooking system 110 can be configured to identify inventory items with a similarity value exceeding a predetermined threshold value as similar inventory items. As a non-limiting example, the value of this predetermined threshold can be greater than 0.8 and less than 1.0. For example the value of this threshold can be 0.9. In some embodiments, rebooking system 110 can provide indications of all similar inventory items to the user. In various embodiments, rebooking system 110 can only provide indications of a certain number of similar inventory items with the highest similarity values. For example, the inventory item with the highest similarity values, or the two inventory items with the highest similar values, or the N inventory items with the highest similar values, where N is less than or equal to 10. In some embodiments, rebooking system 110 can only provide indications of a certain number of the similar inventory items with the highest price drop (or greatest increase in reputation) compared to the reserved inventory item. For example, the inventory item with the highest price drop (or greatest increase in reputation), or the two inventory items with the highest price drop (or greatest increase in reputation), or the N inventory items with the highest price drop (or greatest increase in reputation), where N is less than or equal to 10. In some embodiments, the similar inventory items provided can depend on both the similarity value and the magnitude of the price drop for the similar inventory items.

In some embodiments, rebooking system 110 can input a subset of the comparison feature vector to a neural network to determine a similarity value for that subset of the comparison feature vector. For example, rebooking system 110 can determine a similarity value for inventory items differing by one or more particular inventory parameters from the reserved inventory item. For example, when the reserved inventory item is a hotel room that allows smoking, rebooking system 110 can be configured to provide non-smoking rooms that otherwise match the reserved inventory item. As an additional example, rebooking system 110 can determine a similarity value for inventory items with one or more inventory parameters having fixed values. For example, when the reserved inventory item is a hotel room, rebooking system 110 can be configured to provide only smoking rooms or only refundable rooms.

As would be appreciated by one of skill in the art, the particular order and arrangement of steps disclosed in FIG. 9 is not intended to be limiting. For example, steps can be re-arranged or combined without departing from the envisioned embodiments. Steps can be divided into sub-steps that can be performed in a different order, or by other components of system 100. Furthermore, additional steps may be added or steps may be removed without departing from the envisioned embodiments.

Figure 10A:
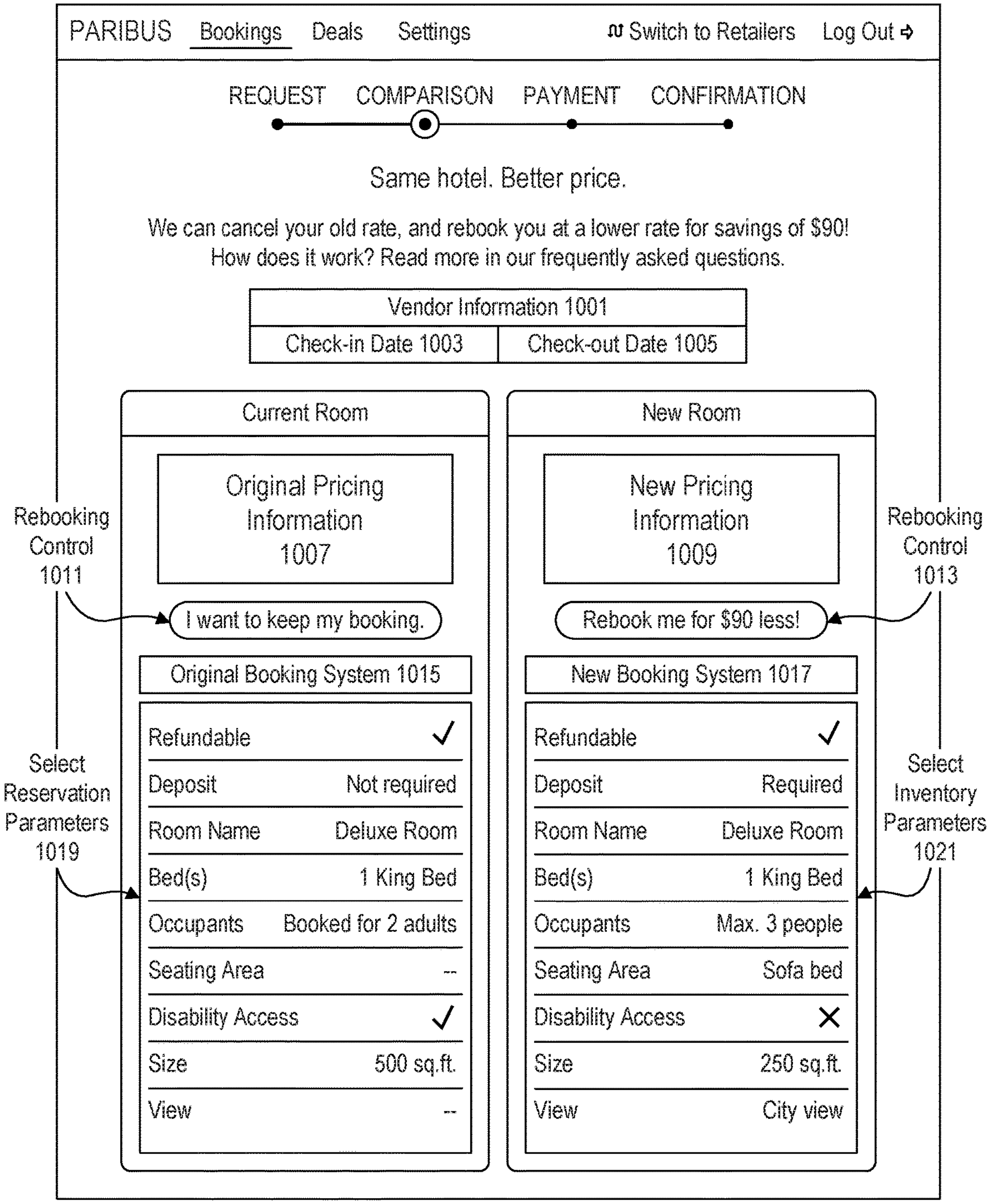
FIGS. 10A and 10B depict an exemplary graphical user interfaces for displaying a rebooking option.

FIG. 10A depicts an exemplary graphical user interface for displaying a rebooking option, consistent with disclosed embodiments. As shown in this example, the graphical user interface can be configured to display vendor information 1001. This vendor information can include the name, and potentially the address of the service provider (e.g., the hotel, airline, entertainment venue, etc.). When the reserved inventory item is a hotel room, the graphical user interface can be configured to display check-in date 1003 and check-out date 1005. The graphical user interface can also be configured to display reserved inventory item information (e.g., current room information) and similar inventory item information (e.g., new room information). The similar inventory item could have been determined to be similar according to the process described in FIG. 9. For each of the reserved inventory item and the similar inventory item, the graphical user interface can be configured to display pricing information (e.g., original pricing information 1007 and new pricing information 1009), the online booking agency or service provider used to make the original reservation (original booking system 1015), the online booking agency or service provider offering the similar inventory item (new booking system 1017), and a listing of select reservation parameters 1019 and select inventory parameters 1021.

Figure 10B:
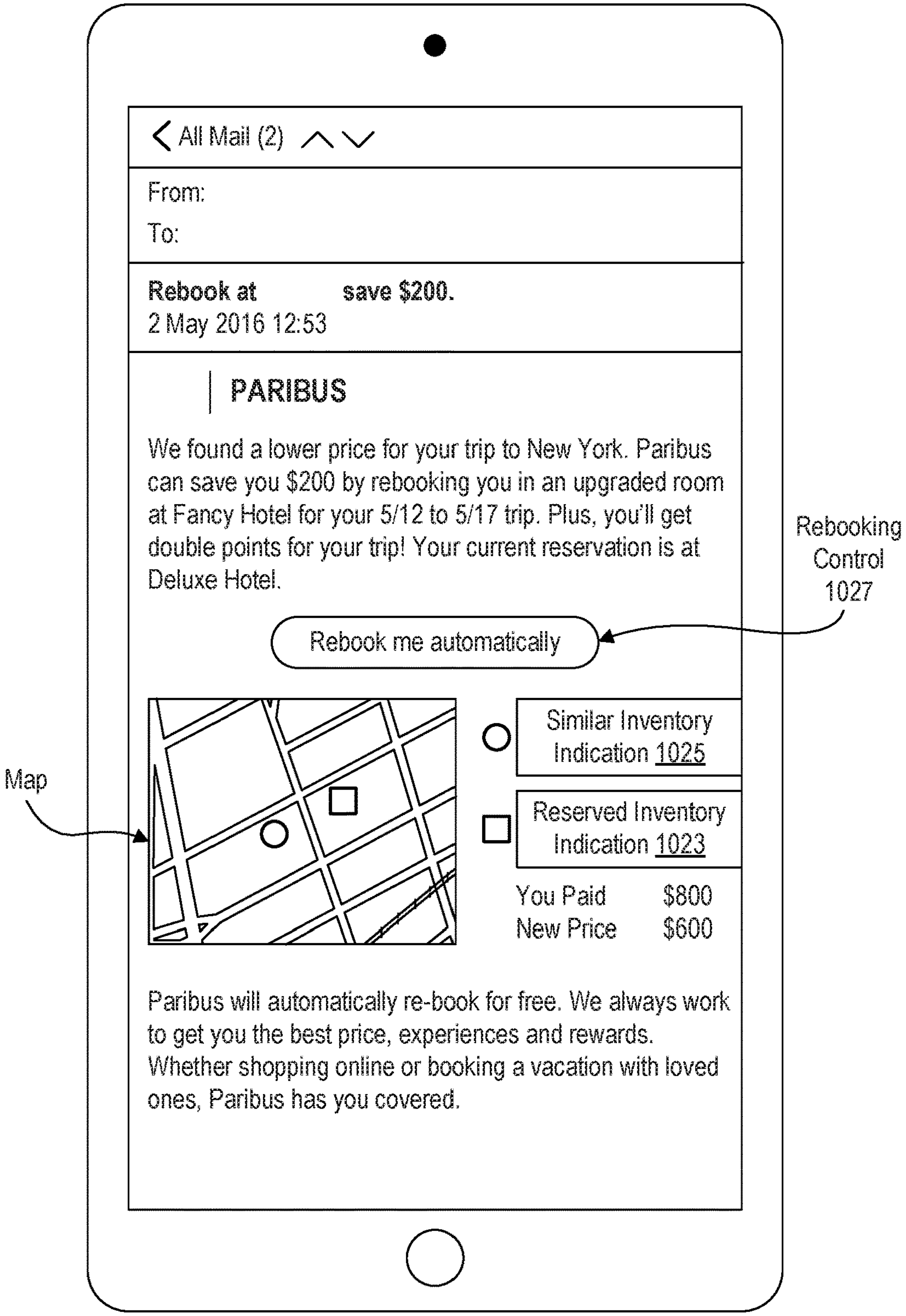

FIG. 10B depicts another exemplary graphical user interface for displaying a rebooking option, consistent with disclosed embodiments. As shown in this example, this alternative graphical user interface can include reserved inventory indication 1023. Reserved inventory indication 1023 can be configured to display the name, and potentially the address of the service provider (e.g., the hotel, airline, entertainment venue, etc.) for the reserved inventory item. In addition, the graphical user interface can include similar inventory indication 1025. Similar inventory indication 1025 can be configured to display the name, and potentially the address of a service provider (e.g., the hotel, airline, entertainment venue, etc.) for an inventory item similar to the reserved inventory item. The similar inventory item could have been determined to be similar according to the process described in FIG. 9. Though only a single item of similar inventory is depicted in FIG. 10B, the graphical user interface could also be configured to show multiple items of similar inventory.

As would be recognized by one of skill in the art, other graphical user interfaces in addition to those shown in FIG. 10A and FIG. 10B could be used to communicate rebooking opportunities to the user. Furthermore, the graphical user interface of FIG. 10A could be used to display one or more similar inventory items provided by a different service provider, while the graphical user interface of FIG. 10B could be used to display one or more similar inventory items provided by the same service provider. Therefore, the graphical user interfaces depicted in FIG. 10A and FIG. 10B are not intended to be limiting.

Automated Rebooking

Automated programs that run over the internet ("bots") are generally not treated by websites the same way as human users. In general, websites will try to limit interactions with bots as this "bot traffic" can be harmful (e.g., bots can perform web scraping, steal content, and manipulate website analytics) and interactions with bots can divert computing resources from more valuable interactions with human users. Therefore companies provide software for automatically detecting and blocking requests from bots (e.g., SHIELDSQUARE and DATADOME bot detection and blocking tools). Online booking agencies and service provider websites can use such software to identify and block requests from bots.

Bot identification and blocking software can interfere with automated rebooking systems, such as system 100. Online booking agencies and service provider websites may identify cancellation requests by such automated rebooking systems as bot traffic. The online booking agencies and service provider websites may therefore block such cancellation requests. Thus software intended to combat harmful bots traffic can hinder user-authorized cancellation requests, interfering with the proper operation of system 100.

The disclosed systems and methods describe an innovative anti-fingerprinting approach to combatting this internet-centric problem. Generally, bot traffic can be detected because requests provided by bots exhibit similar characteristics. For example, when contacting a website, web browsers typically provide a "User-Agent" header field containing information about the capabilities of the system running the web browser to the website. As known in the art, this header field can include compatibility information (e.g., "Mozilla/5.0"), operating system information describing the operating system running the browser (e.g., "Windows NT 6.1"), browser information identifying the browser and browser version (e.g., "Safari/602.1"), information identifying the computing device type (e.g., "Mobile/14E304"), and potentially additional information concerning the configuration of the requesting system. Such requests can also include an IP address of the requesting system. A website can use this information to create "fingerprints" of computing devices contacting the website. Requests from a bot targeting a website will typically have similar fingerprints (e.g., similar user agents and IP addresses). For example, such requests may exhibit user agents indicating the same browser, browser version, operating system, device type, or other parameters. Such requests may be sent from a limited number of IP addresses. A website can use these similarities to identify bots and block bot traffic.

Figure 11:
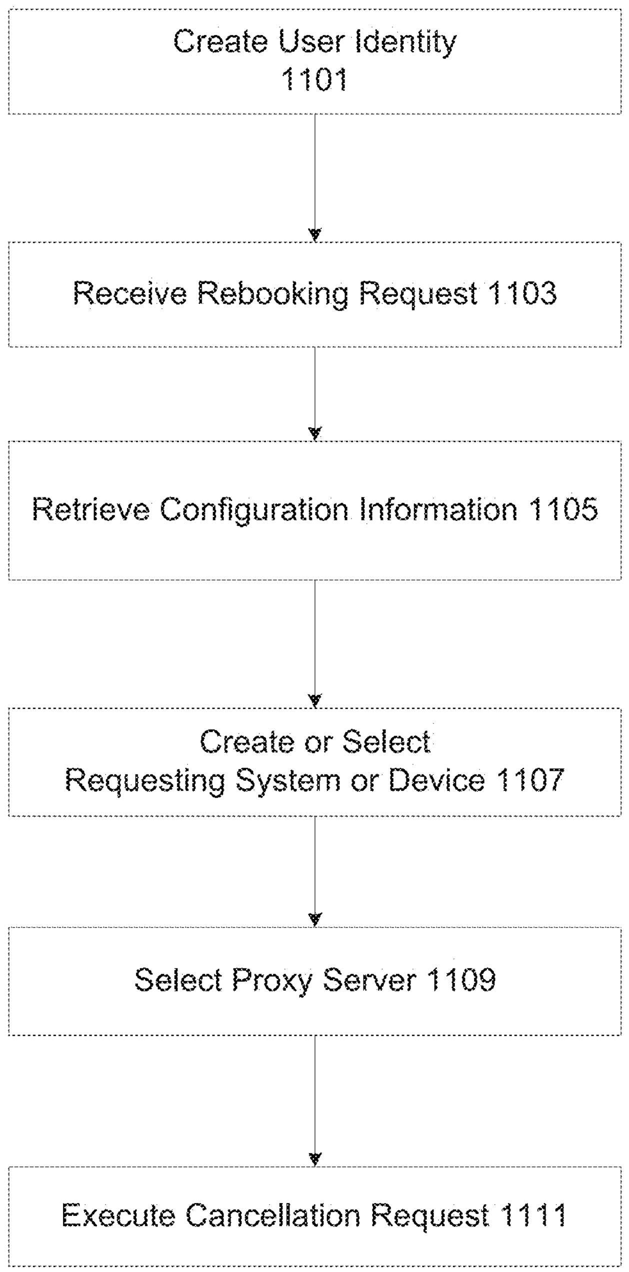
FIG. 11 is a flowchart of an exemplary automated cancellation process.

FIG. 11 depicts a flowchart of an exemplary automated cancellation process, consistent with disclosed embodiments. This automated cancellation process provides a technical solution to the problem of websites identifying and blocking cancellation requests as bot traffic. According to this process, rebooking system 110 mimics the human user that originally made the reservation when providing cancellation requests to online booking agencies and service providers. In some embodiments, each cancellation request therefore appears to come from the human user that originally made the reservation. This reduces the ability of the website to identify and block the cancellation request as bot traffic.

In step 1101, rebooking system 110 can create a user identity for a user. The user identity can include personal information for the user and IP address and a device configuration for the computing device of the user. In this manner, the user identity associates the user with the computing device of the user. In some embodiment, rebooking system 110 can create the user identity during a user registration process. During this user registration process, rebooking system 110 can receive the personal information from the user and create a fingerprint of the computing device of the user. For example, rebooking system 110 can be configured to determine the IP address and the device configuration for the computing device of the user. For example, rebooking system 110 can determine the device configuration by parsing the "User-Agent" header field provided by the computing device of the user. The personal information can include information sufficient to uniquely identify the user to rebooking system 110. As a non-limiting example, the personal information can include email address, birthday, phone number, first and last name, credit card number, mailing address, and similar identifying information. The device configuration can include at least one of compatibility information, operating system information, browser information, browser version information, and computing device type information. In some embodiments, rebooking system 110 can store the user identity. Rebooking system 110 can be configured to store the user identity within rebooking system 110, another component of system 100, or another system that communicates with rebooking system 110 to store and retrieve user identities. Rebooking system 110 can be configured to store the user identity as a record in a database. In some embodiments, rebooking system 110 can be configured to store the device configuration as at least one of (i) a text field including at least a portion of the "User-Agent" header field, (ii) a value indicating the "User-Agent" header field (e.g., an integer value, a category value, an enumerated datatype value, or some other representative value), or (iii) multiple values corresponding to different components of the User-Agent header field (e.g., values for the operating system, browser, device type, etc.).

In step 1103, rebooking system 110 can receive a rebooking request from a user (e.g., as discussed with regard to step 217 of FIG. 2). As non-limiting examples, the user can provide the rebooking request in an email or instant message. In some embodiments, the rebooking request may not indicate the configuration information and IP address of the computing device of the user.

In step 1105, rebooking system 110 can use the rebooking request and/or reservation parameters to retrieve the stored device configuration. Rebooking system 110 can be configured to retrieve the stored device configuration from the stored user identity of the user. In some embodiments, rebooking system 110 can be configured to use personal information in the rebooking request and/or reservation parameters to locate the stored user identity of the user. For example, the rebooking request can include the email address (when the rebooking request is an email) or phone number (when the rebooking request is an instant message) of the user. As an additional example, the reservation parameters can include the first and last name of the user. In some embodiments, rebooking system 110 can be configured to use such personal information as a key to retrieve the appropriate user identity from a database storing user identities.

In step 1107, rebooking system 110 can be configured to create or select a cancellation device to provide the cancellation request. The cancellation device can match the retrieved device configuration. For example, the cancellation device can have the operating system, browser, and browser version described in the retrieved device configuration.

In some embodiments, the cancellation device can be a virtual machine. This virtual machine can be running on a cloud-based platform (e.g., SOFTLAYER) configured to run multiple virtual machines according to methods known to one of skill in the art. In response to the rebooking request, rebooking system 110 can be configured to create a virtual machine matching the retrieved device configuration, or select an existing virtual machine matching the retrieved device configuration. The platform or the virtual machine can be a component of rebooking system 110. In various embodiments, the cancellation device can be a computing device matching the stored device configuration. For example, when the stored device configuration describes an iPhone 7, the cancellation device can be an iPhone 7. The computing device can be a component of rebooking system 110.

Alternatively, for example when a stored device configuration is unavailable, rebooking system 110 can be configured to use a cancellation device having a device configuration randomly selected from a distribution of possible device configurations. This distribution of possible device configurations can be an observed distribution of device configurations, as measured by NETMARKETSHARE, STATCOUNTER, or a similar provider of internet usage statistics.

In step 1109, rebooking system 110 can select a server for proxying network traffic concerning the cancellation request. The server can be a component of rebooking system 110, and can be one of a geographically distributed set of proxy servers. For example, the proxy servers can be distributed individually, or in groups, among multiple cities, states, zip codes, or area codes (e.g., among N cities, states, zip codes, or area codes, where N is a number less than 500). Rebooking system 110 can be configured to select the server based on the stored user identity of the user. As described above, the stored user identity can include a stored IP address of the computing device of the user. In some embodiments, the server can have an IP address resembling the stored IP address (e.g., an IP address in a subnet range similar to that of the stored IP address). In various embodiments, rebooking system 110 can be configured to select the server based on the geographic location of the server. For example, rebooking system 110 can be configured to determine a geographic location for the stored IP address, according to methods known to one of skill in the art. Rebooking system 110 can be configured to select the server because the server is geographically located in the same city, state, zip code, or area code as the geographic location for the stored IP address. Alternatively, for example when a stored IP address is unavailable, rebooking system 110 can be configured to select a proxy server at random.

In step 1111, rebooking system 110 can execute the cancellation script on the cancellation device, causing the cancellation device to provide the cancellation request to prior booking system 140. For example, when the cancellation device is a virtual machine, rebooking system 110 can be configured to execute the cancellation script on this virtual machine. As an additional example, when the cancellation device is a computing device, rebooking system 110 can be configured to remotely connect to the computing device to execute the cancellation script. In various embodiments, rebooking system 110 can be configured to proxy network traffic concerning the cancellation request through the proxy server selected in step 1109. In this manner, rebooking system 110 can be configured to provide a cancellation request to the online booking agency or service provider that mimics both the configuration and the IP address of the computing device of the user.

As would be appreciated by one of skill in the art, the particular order and arrangement of steps disclosed in FIG. 11 is not intended to be limiting. For example, steps can be re-arranged or combined without departing from the envisioned embodiments. Steps can be divided into sub-steps that can be performed in a different order, or by other components of system 100. Furthermore, additional steps may be added or steps may be removed without departing from the envisioned embodiments.

Figure 12:
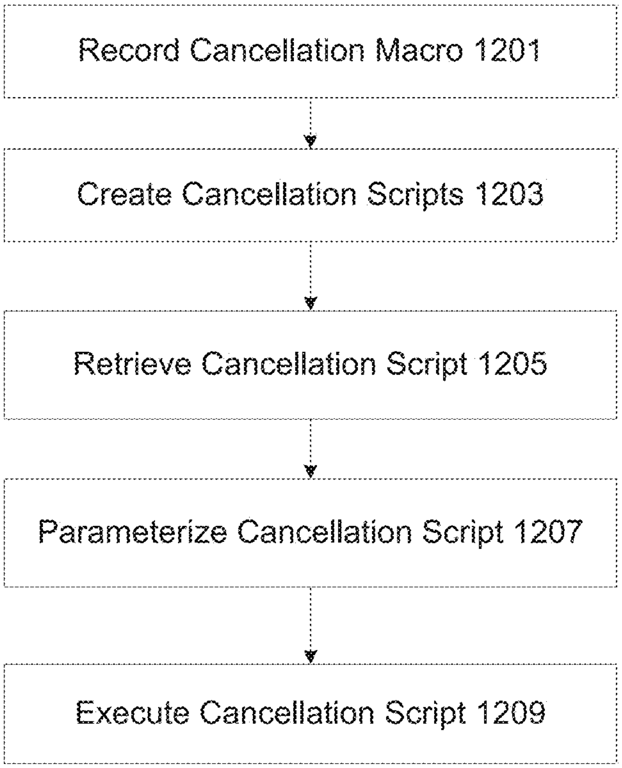
FIG. 12 is a flowchart of an exemplary method for generating a cancellation function.

FIG. 12 is a flowchart of an exemplary method for automatically cancelling a reservation using a cancellation script, consistent with disclosed embodiments. In some embodiments, this process includes creating and storing parameterized scripts, and then executing the appropriate script with the appropriate reservation parameters to cancel a reservation. In this manner, rebooking system 110 can be configured to simulate, as a non-limiting example, the series of browser clicks and form entries that a human user would perform to cancel a reservation.

In step 1201, components of system 100, or another system, can generate cancellation macros. For example, these macros can be generated by a mobile device, laptop, desktop, workstation, or server independent of system 100 and then later provided to system 100. In some embodiments, human users can create cancellation macros using a browser automation system (e.g., Selenium IDE). To create a macro specific to an online booking agency or service provider, the human user can cancel a reservation using the website of the online booking agency or service provider. This cancellation process can be recorded using the browser automation system to create the macro.

In step 1203, a computing device can create a cancellation function by replacing specific values for one or more reservation parameters in the recorded macro with placeholders. As a non-limiting example, while creating the macro, a human user may enter a confirmation number for the reservation being cancelled. The computing device can create the cancellation function by replacing this confirmation number with a confirmation number placeholder. Another reservation can then be cancelled using this cancellation function by replacing the confirmation number placeholder with the confirmation number for the other reservation and then executing the script. In this manner, scripts can easily be created for automatically cancelling reservations with many different online booking agencies and service providers. Such cancellation functions can be stored on components of system 100 (e.g., rebooking system 110), or stored on another system.

In some embodiments, a human user can identify the reservation parameters for replacement. For example, the human user can indicate one or more reservation parameter/value pairs (e.g., "email" /"w1ll.10.shopping@gmail.com" and "itinerary number" /"7249905397393"). The computing device can then replace instances of the values with placeholders for the corresponding reservation parameters (e.g., the computing device can replace all instances of "w1ll.10.shopping@gmail.com" with a placeholder indicating the reservation parameter "email").

In step 1205, rebooking system 110 can be configured to retrieve a stored cancellation function. Rebooking system 110 can be configured to identify the correct script based on the reservation email. For example, rebooking system 110 can determine from the reservation email the online booking agency or service provider used to create the reservation. Rebooking system 110 can then retrieve a cancellation function adapted to this online booking agency or service provider.

In step 1205, rebooking system 110 can parametrize the cancellation function to create a cancellation script. Rebooking system 110 can be configured to replace placeholders for the reservation parameters such as email address, reservation number, confirmation code, or any other reservation parameters required by the cancellation function. To continue the previous example, rebooking system 110 can receive the reservation parameter/value pairs "email" /"john@gmail.com" and "itinerary_number" /"41982389f0421". Rebooking system 110 can be configured to replace the placeholders for "email" in the cancellation function with "john@gmail.com" and replace the placeholders for "itinerary_number" in the cancellation function with "41982389f0421."

Rebooking system 110 can be configured to parametrize the cancellation function using reservation parameter/value pairs previously parsed from the reservation email, as described above with regard to FIG. 5 (e.g., rebooking system 110 may have parsed the confirmation number/value pair from the reservation email). In some aspects, rebooking system 110 can be configured to use reservation parameter/value pairs stored in a user profile (e.g., user email address, home address, credit card information, etc.). Rebooking system 110 can also be configured to receive additional values or reservation parameter/value pairs from the user. For example, these additional values and reservation parameter/value pairs can be received in response to a prompt provided by rebooking system 110 to the user.

In step 1207, rebooking system 110 can execute the cancellation script to cancel the reservation. In some embodiments, rebooking system 110 can be configured to combine parametrization and execution into a single command. For example, "Cancellation_Function" can be a variable storing the name or location of a cancellation function and "Reservation_Parameters" can be a variable storing one or more reservation parameter/value pairs. The command "Playback.execute(Cancellation_Function, Reservation_Parameters)" can cause rebooking system 110 to execute the cancellation function using the provided one or more reservation parameter/value pairs.

As would be recognized by one of skill in the art, the systems and methods described above with regards to FIGS. 11 and 12 are not limited to performing automated cancellation of reservations. Instead, the disclosed anti-fingerprinting systems and methods can be generally used to prevent websites from blocking automated task performance. In general, as described above, a system can receive a request to perform an automated task on behalf of a human user. The request can include information identifying a device configuration of the human user. In some embodiments the system can determine, the based on the request, the automated task to perform. For example, based on a reservation email, the system can determine the correct script to use for cancelling the reservation. In some embodiments, the request can include code or instructions for performing the task. For example, the human user can create and upload automated tasks for the system to perform. As an additional example, the human user can record a macro using a browser automation system, create a function from the macro, and upload the function to the system. The user can subsequently provide a question calling the function with any necessary parameters.

In some embodiments, the system can be configured to create or select an imitation computing device for performing the automated task, as described above. The system can be configured to proxy traffic for the automated task through a server. The system can select the server because the server has an IP address similar to that of the human user, as described above. In some embodiments, the computing device and the proxy server can be components of the system. In some embodiments they can be distinct from the system.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for automatically performing cancellation tasks, comprising:

at least one processor; and at least one memory containing instructions that, when executed by the at least one processor, cause the system to perform operations including:

generating a cancellation script for a remote website by replacing first cancellation parameters in a cancellation macro with placeholders;

obtaining an IP address and a device configuration of a first computing device of a human user;

creating a user identity including the IP address and the device configuration of the first computing device;

extracting second cancellation parameters using a neural network from a first email sent to the human user, wherein the neural network is trained to extract cancellation parameters from reservation email code;

parameterizing the cancellation script by replacing the placeholders with the second cancellation parameters;

selecting a second computing device for imitating the human user based on the device configuration of the first computing device;

selecting a proxy server based on the user identity created for the first computing device; and cancelling the reservation by causing the second computing device to interact with the remote website according to the parameterized cancellation script through the proxy server.

2. The system of claim 1, the operations further comprising receiving a request to execute the cancellation script on the remote website the request enabling identification of the IP address and the device configuration of the first computing device.

3. The system of claim 2, the operations further comprising:

receiving personal information of the human user;

storing a record in a database including the personal information, the IP address information of the first computing device, and the device configuration information of the first computing device;

determining the personal information from the request; and retrieving the record from the database using the personal information in response to the request.

4. The system of claim 3, wherein the request comprises an email from the human user and the personal information comprises an email address of the human user.

5. The system of claim 3, wherein the request comprises a text message from the human user and the personal information comprises a phone number of the human user.

6. The system of claim 3, wherein the request includes second computing device instructions for executing the task.

7. The system of claim 3, wherein the operations further comprise determining second computing device instructions for executing the task based on the request.

8. The system of claim 1, wherein the device configuration of the first computing device is obtained from a user-agent header field of the first computing device.

9. The system of claim 1, wherein the device configuration for the first computing device comprises operating system information and browser information for the first computing device.

10. The system of claim 1, wherein the second computing device comprises a virtual machine having the device configuration the first computing device.

11. The system of claim 10, wherein selecting the second computing device comprises creating the virtual machine.

12. The system of claim 1, wherein the second computing device has the same make and model as the first computing device.

13. The system of claim 12, wherein causing the second computing device to interact with the remote website using the proxy server to perform the task comprises remotely connecting to the second computing device.

14. The system of claim 1, wherein:

the operations further comprise determining the geographic location of the first computing device of the human user based on the IP address for the first computing device; and the proxy server is selected based on geographic proximity to first the computing device.

15. The system of claim 1, wherein an IP address of the proxy server is in the same subnet range as the IP address of the first computing device.

16. A method for automatically performing cancellation tasks, comprising:

generating a cancellation script for a remote website by replacing first cancellation parameters in a cancellation macro with placeholders;

during a registration stage, receiving personal information of a human user, obtaining an IP address and a device configuration for a computing device, and storing a record in a database, the record including the personal information, the IP address, and the device configuration;

creating a user identity including the IP address and the device configuration of the first computing device;

extracting second cancellation parameters using a neural network from a first email sent to the human user, wherein the neural network is trained to extract cancellation parameters from reservation email code;

receiving a request to interact with the remote website to perform a cancellation task, the request including the personal information;

retrieving the record from the database using the personal information;

creating a virtual machine based on the device configuration;

parameterizing the cancellation script by replacing the placeholders with the second cancellation parameters;

selecting a proxy server from a geographically distributed set of proxy servers based on the user identity created for the computing device and IP addresses for the set of proxy servers, the selected proxy server being a proxy server of the geographically distributed set closest to the computing device; and cancelling the reservation by executing instructions causing the virtual machine to interact with the remote website according to the parameterized cancellation script through the selected proxy server.

17. The method of claim 16, wherein the request comprises an email from the human user and the personal information comprises an email address of the human user.

18. The method of claim 16, wherein the request comprises a text message from the human user and the personal information comprises a phone number of the human user.

19. The method of claim 16, wherein the request includes the instructions.

20. The method of claim 16, wherein the set of proxy servers are geographically distributed among multiple cities.

* * * * *